US012132534B2

(12) United States Patent
Nayak Ullal et al.

(10) Patent No.: US 12,132,534 B2
(45) Date of Patent: Oct. 29, 2024

(54) OPPORTUNISTIC SOUNDING FOR LOW LATENCY APPLICATIONS

(71) Applicant: QUALCOMM Incorporated, San Diego, CA (US)

(72) Inventors: Vinayak Nayak Ullal, Bangalore (IN); Ahmed Ragab Elsherif, San Jose, CA (US); Krishna Mohan Reddy, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/943,892

(22) Filed: Sep. 13, 2022

(65) Prior Publication Data

US 2024/0088951 A1  Mar. 14, 2024

(51) Int. Cl.
| | | |
|---|---|---|
| *H04L 23/02* | (2006.01) | |
| *H04B 7/0426* | (2017.01) | |
| *H04L 5/00* | (2006.01) | |
| *H04W 72/044* | (2023.01) | |
| *H04W 72/0446* | (2023.01) | |
| *H04W 72/54* | (2023.01) | |

(52) U.S. Cl.
CPC .......... *H04B 7/043* (2013.01); *H04L 5/0048* (2013.01); *H04W 72/0446* (2013.01); *H04W 72/046* (2013.01); *H04W 72/54* (2023.01)

(58) Field of Classification Search
CPC . H04W 74/006; H04W 74/046; H04W 72/21; H04B 7/0617; H04B 7/0413; H04B 7/0452
USPC ........................ 375/262, 267, 260
See application file for complete search history.

(56) References Cited

U.S. PATENT DOCUMENTS

| | | | | |
|---|---|---|---|---|
| 2005/0007971 A1* | 1/2005 | Jeong | ...................... | H04W 4/06 370/312 |
| 2018/0092055 A1* | 3/2018 | Cariou | .............. | H04W 56/0005 |
| 2018/0351605 A1* | 12/2018 | Liang | .................. | H04B 7/0617 |

(Continued)

FOREIGN PATENT DOCUMENTS

WO  WO-2017086922 A1  5/2017

OTHER PUBLICATIONS

International Search Report and Written Opinion—PCT/US2023/071361—ISA/EPO—Nov. 20, 2023.

*Primary Examiner* — Khai Tran
(74) *Attorney, Agent, or Firm* — Holland & Hart / QUALCOMM Incorporated

(57) ABSTRACT

Methods, systems, and devices for wireless communications for opportunistic sounding for low latency applications are described. An access point (AP) may communicate with one or more stations (STAs), and may communicate a control message indicating more than one periodic service periods for wireless communication with the one or more STAs. The AP may transmit, via a transmit beam, a data message during a first service period of the more than one periodic service periods based on a first compressed beamforming estimate (CBF) for the transmit beam being satisfactory for the first service period and transmit one or more sounding signals during the first service period after transmitting the data message based on the first CBF being suboptimal for a second service period that occurs after the first service period. The STA(s) may transmit, and the AP may receive, an indication of a second CBF based on the one or more sounding signals.

30 Claims, 16 Drawing Sheets

(56) References Cited

U.S. PATENT DOCUMENTS

2020/0044974 A1\* 2/2020 Jiang ................ H04L 43/16
2020/0329489 A1\* 10/2020 Li .................... H04L 1/0009
2021/0410089 A1\* 12/2021 Choi ............... H04W 74/0808

\* cited by examiner

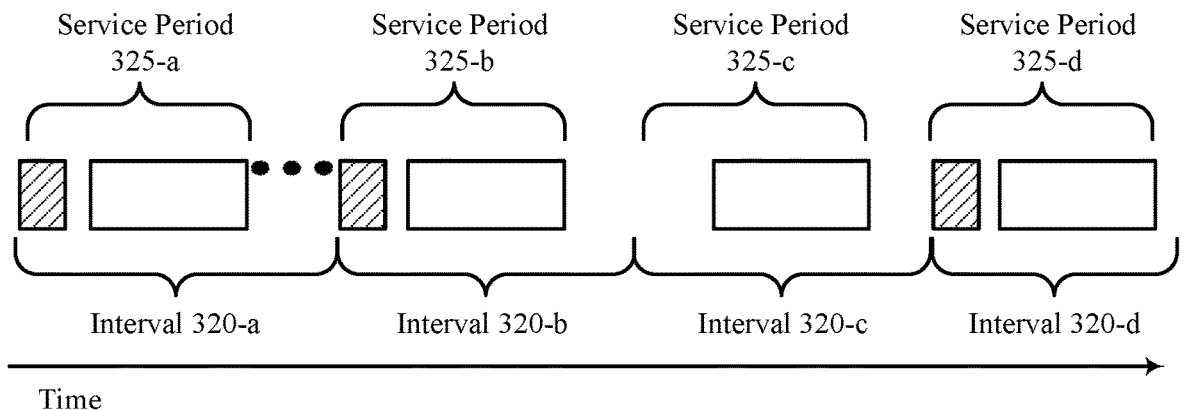
FIG. 3A
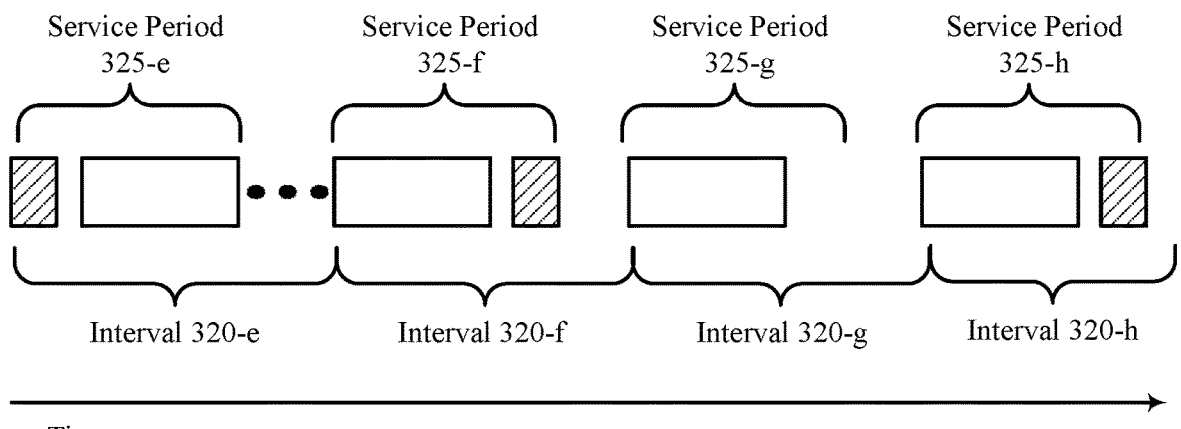
FIG. 3B
 Sounding Procedure 305
 Data 310

OPPORTUNISTIC SOUNDING FOR LOW LATENCY APPLICATIONS

BACKGROUND

The following relates to wireless communications, including opportunistic sounding for low latency applications.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the STA, and the UL (or reverse link) may refer to the communication link from the STA to the AP.

SUMMARY

The described techniques relate to improved methods, systems, devices, or apparatuses that support opportunistic sounding for low latency applications. Generally, the described techniques provide for an access point (AP) to communicate with one or more stations (STAs). The AP may transmit sounding reference signals (SRSs) before or after data transmission during a given service period, which may improve reliability of communications, without sacrificing latency for data transmissions. For example, the AP may determine that a previous beamforming channel estimate (e.g., a compressed beamforming estimate (CBF)) that provides satisfactory performance for a current period (e.g., may be used to select a beam that provides reasonable throughput, has a reasonable error rate, has reasonable directionality alignment between the AP and the STA, etc.) may be suboptimal (e.g., unsatisfactory or results in degraded performance) for a next service period (e.g., due to expiration of a timer associated with the current beamforming channel estimate, mobility of the STA, Doppler effect of the STA, etc.). In such examples, the AP may first transmit data during the current service period (e.g., satisfying latency requirements by not increasing signaling overhead prior to transmission of the data), and may then perform sounding procedures (e.g., transmit sounding signals and receive a new beamforming channel estimate from the STA after transmitting the data during the current service period). The AP may then use the new beamforming channel estimate for transmitting data during a next service period. Each time a current beamforming channel estimate becomes suboptimal (e.g., a timer associated with the beamforming channel estimate is about to expire or one or more parameters change at the STA), the AP may initiate another sounding procedure at the end (e.g., after transmitting data) during a current or next service period.

A method for wireless communications at an AP is described. The method may include communicating, with one or more STAs, a control message indicating a set of multiple periodic service periods for wireless communication with the one or more STAs, transmitting, via a transmit beam, a data message during a first service period of the set of multiple periodic service periods based on a first beamforming channel estimate for the transmit beam being satisfactory for the first service period, transmitting one or more sounding signals during the first service period after transmitting the data message based on the first beamforming channel estimate being suboptimal for a second service period that occurs after the first service period, and receiving, from the one or more STAs, an indication of a second beamforming channel estimate based on the one or more sounding signals.

An apparatus for wireless communications at an AP is described. The apparatus may include a processor, memory coupled with the processor, and instructions stored in the memory. The instructions may be executable by the processor to cause the apparatus to communicate, with one or more STAs, a control message indicating a set of multiple periodic service periods for wireless communication with the one or more STAs, transmit, via a transmit beam, a data message during a first service period of the set of multiple periodic service periods based on a first beamforming channel estimate for the transmit beam being satisfactory for the first service period, transmit one or more sounding signals during the first service period after transmitting the data message based on the first beamforming channel estimate being suboptimal for a second service period that occurs after the first service period, and receive, from the one or more STAs, an indication of a second beamforming channel estimate based on the one or more sounding signals.

Another apparatus for wireless communications at an AP is described. The apparatus may include means for communicating, with one or more STAs, a control message indicating a set of multiple periodic service periods for wireless communication with the one or more STAs, means for transmitting, via a transmit beam, a data message during a first service period of the set of multiple periodic service periods based on a first beamforming channel estimate for the transmit beam being satisfactory for the first service period, means for transmitting one or more sounding signals during the first service period after transmitting the data message based on the first beamforming channel estimate being suboptimal for a second service period that occurs after the first service period, and means for receiving, from the one or more STAs, an indication of a second beamforming channel estimate based on the one or more sounding signals.

A non-transitory computer-readable medium storing code for wireless communications at an AP is described. The code may include instructions executable by a processor to communicate, with one or more STAs, a control message indicating a set of multiple periodic service periods for wireless communication with the one or more STAs, transmit, via a transmit beam, a data message during a first service period of the set of multiple periodic service periods based on a first beamforming channel estimate for the transmit beam being satisfactory for the first service period, transmit one or more sounding signals during the first service period after transmitting the data message based on the first beamforming channel estimate being suboptimal for a second service period that occurs after the first service period, and receive, from the one or more STAs, an indication of a second beamforming channel estimate based on the one or more sounding signals.

Some examples of the method, apparatuses, and non-transitory computer-readable medium described herein may further include operations, features, means, or instructions for transmitting a second data message to the one or more STAs during the second service period via a second transmit beam, where the second transmit beam may be based on the second beamforming channel estimate.

In some examples of the method, apparatuses, and non-transitory computer-readable medium described herein, the second beamforming channel estimate may be satisfactory for the second service period.

In some examples of the method, apparatuses, and non-transitory computer-readable medium described herein, transmitting the one or more sounding signals may include operations, features, means, or instructions for transmitting the one or more sounding signals during the first service period after transmitting the data message based on expiration of a timer associated with the first beamforming channel estimate.

In some examples of the method, apparatuses, and non-transitory computer-readable medium described herein, transmitting the one or more sounding signals may include operations, features, means, or instructions for transmitting the one or more sounding signals during the first service period after transmitting the data message based on a doppler change, a mobility status, or both, associated with the one or more STAs.

Some examples of the method, apparatuses, and non-transitory computer-readable medium described herein may further include operations, features, means, or instructions for refraining from transmitting one or more additional sounding signals during the second service period based on the second beamforming channel estimate being satisfactory for a third service period that occurs after the second service period.

Some examples of the method, apparatuses, and non-transitory computer-readable medium described herein may further include operations, features, means, or instructions for transmitting one or more additional sounding signals after transmitting a second data message during the second service period based on the second beamforming channel estimate being suboptimal for a third service period that occurs after the second service period.

In some examples of the method, apparatuses, and non-transitory computer-readable medium described herein, the AP includes a virtual reality renderer, a multi-user streaming device, an audio streaming device, a video streaming device, or a wireless controller in an industrial deployment.

A method for wireless communications at a STA is described. The method may include communicating, with an AP, a control message indicating a set of multiple periodic service periods for wireless communication with the AP, receiving, via a receive beam, a data message during a first service period of the set of multiple periodic service periods based on a first beamforming channel estimate for the receive beam being satisfactory for the first service period, receiving one or more sounding signals during the first service period after receiving the data message based on the first beamforming channel estimate being suboptimal for a second service period that occurs after the first service period, and transmitting, to the AP t, an indication of a second beamforming channel estimate based on the one or more sounding signals.

An apparatus for wireless communications at a STA is described. The apparatus may include a processor, memory coupled with the processor, and instructions stored in the memory. The instructions may be executable by the processor to cause the apparatus to communicate, with an AP, a control message indicating a set of multiple periodic service periods for wireless communication with the AP, receive, via a receive beam, a data message during a first service period of the set of multiple periodic service periods based on a first beamforming channel estimate for the receive beam being satisfactory for the first service period, receive one or more sounding signals during the first service period after receiving the data message based on the first beamforming channel estimate being suboptimal for a second service period that occurs after the first service period, and transmit, to the AP, an indication of a second beamforming channel estimate based on the one or more sounding signals.

Another apparatus for wireless communications at a STA is described. The apparatus may include means for communicating, with an AP, a control message indicating a set of multiple periodic service periods for wireless communication with the AP, means for receiving, via a receive beam, a data message during a first service period of the set of multiple periodic service periods based on a first beamforming channel estimate for the receive beam being satisfactory for the first service period, means for receiving one or more sounding signals during the first service period after receiving the data message based on the first beamforming channel estimate being suboptimal for a second service period that occurs after the first service period, and means for transmitting, to the AP, an indication of a second beamforming channel estimate based on the one or more sounding signals.

A non-transitory computer-readable medium storing code for wireless communications at a STA is described. The code may include instructions executable by a processor to communicate, with an AP, a control message indicating a set of multiple periodic service periods for wireless communication with the AP, receive, via a receive beam, a data message during a first service period of the set of multiple periodic service periods based on a first beamforming channel estimate for the receive beam being satisfactory for the first service period, receive one or more sounding signals during the first service period after receiving the data message based on the first beamforming channel estimate being suboptimal for a second service period that occurs after the first service period, and transmit, to the AP, an indication of a second beamforming channel estimate based on the one or more sounding signals.

Some examples of the method, apparatuses, and non-transitory computer-readable medium described herein may further include operations, features, means, or instructions for receiving a second data message from the AP during the second service period via a second transmit beam, where the second transmit beam may be based on the second beamforming channel estimate.

In some examples of the method, apparatuses, and non-transitory computer-readable medium described herein, the second beamforming channel estimate may be satisfactory for the second service period.

In some examples of the method, apparatuses, and non-transitory computer-readable medium described herein, receiving the one or more sounding signals may include operations, features, means, or instructions for receiving the one or more sounding signals during the first service period after receiving the data message based on expiration of a timer associated with the first beamforming channel estimate.

In some examples of the method, apparatuses, and non-transitory computer-readable medium described herein, receiving the one or more sounding signals may include operations, features, means, or instructions for receiving the one or more sounding signals during the first service period after receiving the data message based on a doppler change, a mobility status, or both, associated with the STA.

Some examples of the method, apparatuses, and non-transitory computer-readable medium described herein may further include operations, features, means, or instructions for refraining from monitoring for one or more additional sounding signals during the second service period based on the second beamforming channel estimate being satisfactory for a third service period that occurs after the second service period.

Some examples of the method, apparatuses, and non-transitory computer-readable medium described herein may further include operations, features, means, or instructions for receiving one or more additional sounding signals after receiving a second data message during the second service period based on the second beamforming channel estimate being suboptimal for a third service period that occurs after the second service period.

In some examples of the method, apparatuses, and non-transitory computer-readable medium described herein, the STA includes a virtual reality head mount device, a multi-user streaming device, an audio streaming device, a video streaming device, or a wireless receiver in an industrial deployment.

BRIEF DESCRIPTION OF THE DRAWINGS

FIG. 3A and FIG. 3B illustrate examples of timelines that support opportunistic sounding for low latency applications in accordance with one or more aspects of the present disclosure.

DETAILED DESCRIPTION

Figure 1:
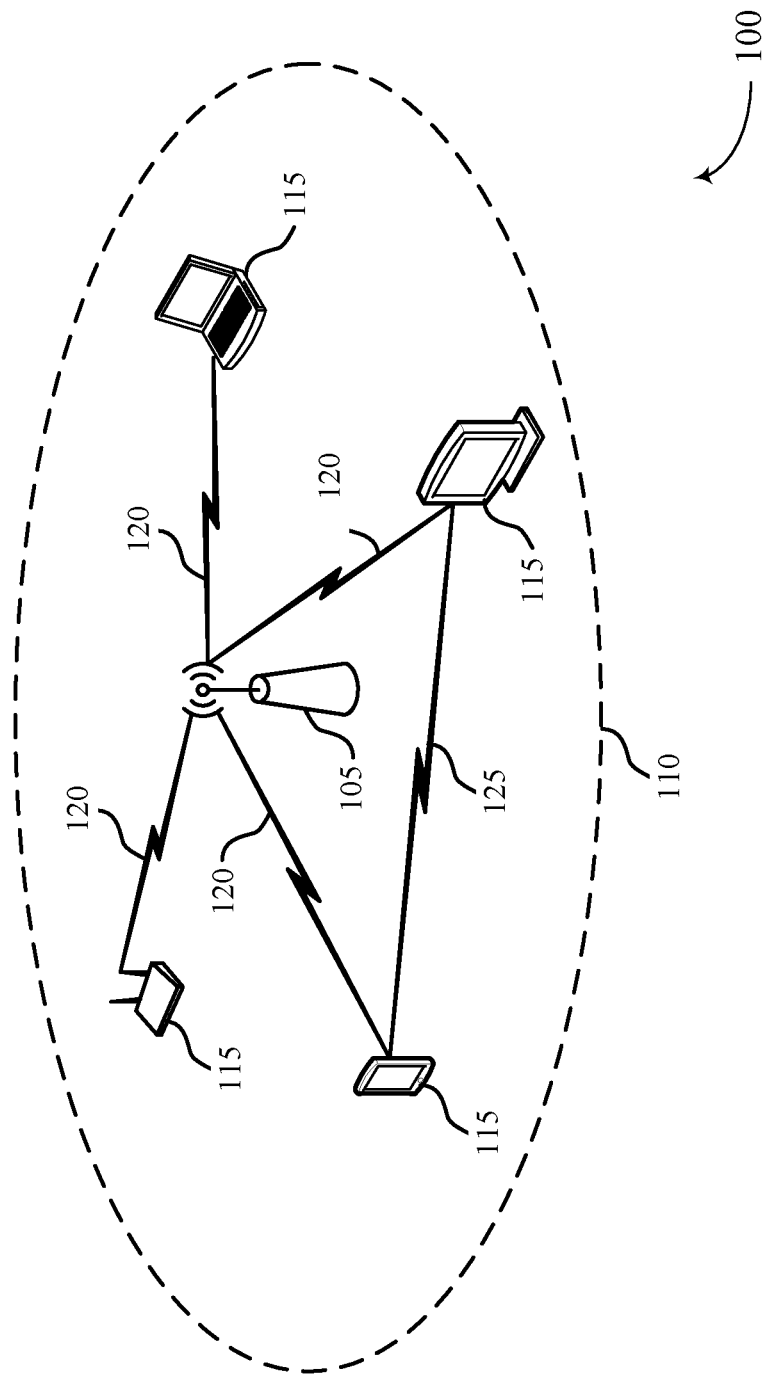
FIG. 1 illustrates an example of a wireless communications system that supports opportunistic sounding for low latency applications in accordance with aspects of the present disclosure.

Some wireless devices may perform wireless communications (e.g., Wi-Fi communications) where one or more applications (e.g., virtual reality (VR), audio streaming, video streaming, as well as other applications), may be subject to strict latency requirements (e.g., where end to end latency cannot exceed 4 ms). An access point (AP) and station (STA) (e.g., VR headset) may communicate according to a service period protocol, which may reduce power expenditures and improve battery life. In some examples, the renderer may be located at the VR headset, and techniques described herein may be performed between the renderer and the VR headset. For example, the STA may wake up periodically during configured service periods to receive signaling from the AP. Short range, or line of sight, communications between the AP and the STA during service periods may satisfy latency conditions. However, non-line-of-sight communications, communications over larger distances, etc., may result in communications that fail to satisfy latency requirements for some applications. Performance of the AP and STA may be further improved by implemented multiple user/multiple input/multiple output (MU-MIMO) signaling, which may rely on sounding procedures (e.g., transmission of sounding reference signals (SRSs) by the AP prior to data transmissions for beam selection based on beamforming channel estimates determined and reported by the STA). However, sounding procedures to determine beamforming channel quality may increase latency, and may result in failed communications or communications that fail to satisfy the latency requirements.

Techniques described may provide for the AP to transmit SRSs after data transmission during a given service period, which may improve reliability of communications, without sacrificing latency for data transmissions. For example, the AP may determine that a previous beamforming channel estimate (e.g., a compressed beamforming estimate (CBE)) that provides satisfactory performance for a current period may be suboptimal for a next service period (e.g., due to expiration of a timer associated with the current beamforming channel estimate, mobility of the STA, Doppler effect of the STA, etc.). In such examples, the AP may first transmit data during the current service period (e.g., satisfying latency requirements by not increasing signaling overhead prior to transmission of the data), and may then perform sounding procedures (e.g., transmit sounding signals and receive a new beamforming channel estimate from the STA after transmitting the data during the current service period). The AP may then use the new beamforming channel estimate for transmitting data during a next service period. Each time a current beamforming channel estimate becomes suboptimal (e.g., is about to expire or parameters change at the STA), the AP may initiate another sounding procedure at the end (e.g., after transmitting data) during a current or next service period.

Aspects of the disclosure are initially described in the context of a wireless communications system. Aspects of the disclosure are further illustrated by and described with reference to a wireless communication system, timelines, and a process flow diagram. Aspects of the disclosure are further illustrated by and described with reference to apparatus diagrams, system diagrams, and flowcharts that relate to opportunistic sounding for low latency applications.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

Techniques described may provide for the AP 105 to transmit SRSs after data transmission during a given service period. For example, the AP 105 may determine that a previous beamforming channel estimate (e.g., which may be referred to as a compressed beamforming (CBF) estimate, or a CBE, among other examples) that is satisfactory for a current period may be suboptimal for a next service period (e.g., due to expiration of a timer associated with the current beamforming channel estimate, mobility of the STA 115, Doppler effect of the STA 115, etc.). In such examples, the AP 105 may first transmit data during the current service period (e.g., satisfying latency requirements by not increasing signaling overhead prior to transmission of the data), and may then perform sounding procedures (e.g., transmit sounding signals and receive a new beamforming channel estimate from the STA 115 after transmitting the data during the current service period). The AP 105 may then use the new beamforming channel estimate for transmitting data during a next service period. Each time a current beamforming channel estimate becomes suboptimal (e.g., is about to expire or parameters change at the STA 115), the AP 105 may initiate another sounding procedure at the end (e.g., after transmitting data) during a current or next service period.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
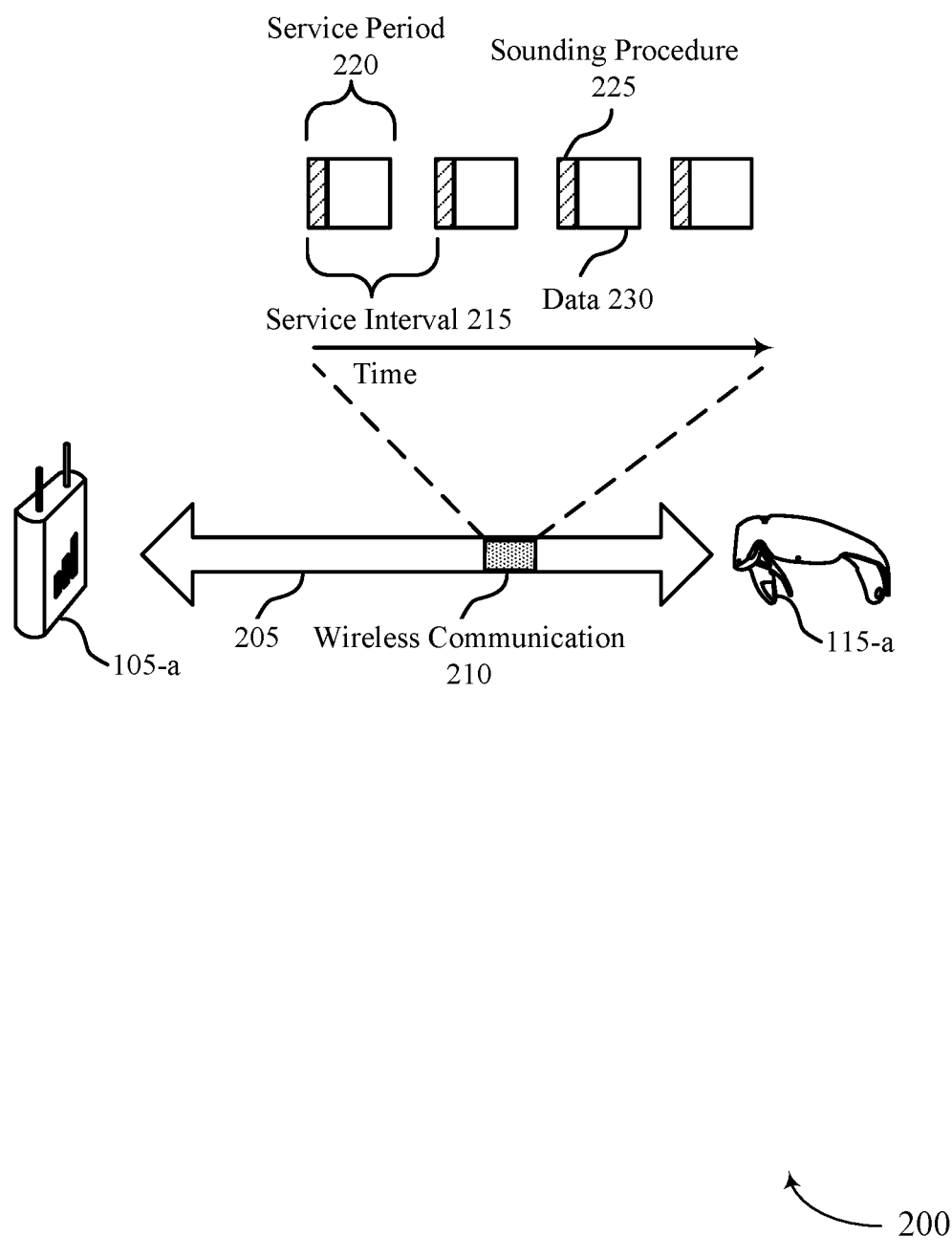
FIG. 2 illustrates an example of a wireless communications system that supports opportunistic sounding for low latency applications in accordance with one or more aspects of the present disclosure.

FIG. 2 illustrates an example of a wireless communications system 200 that supports opportunistic sounding for low latency applications in accordance with one or more aspects of the present disclosure. Wireless communications system 200 illustrates communication between an AP 105-a and a STA 115-a. The AP 105-a may be an example of an AP 105 as described with reference to FIG. 1, and the STA 115-a may be an example of a STA 115 as described with reference to FIG. 1. The AP 105-a may connect to and communicate with the STA 115-a using communication link 205 (e.g., Wi-Fi link). One or more wireless communications 210 may be transmitted or received by the AP 105-a or the STA 115-a.

The STA 115-a may use a Wi-Fi link for data transfer between the STA 115-a and the AP 105-a. The STA 115-a may be a VR headset, head mount device (HMD), phone, or wireless extended reality (XR) headset, among other examples. The AP 105-a may be a renderer, among other examples. Although illustrated with reference to a renderer (e.g., AP 105-a) and HMD (e.g., STA 115-a), techniques described with reference to FIG. 2, or other figures, may also be applicable for additional or alternative applications. For example, applications may include audio streaming, video streaming, video streaming to more than one UE, robotics deployment, time sensitive networks, wireless time sensitive networks, and applications where there is a latency requirement, among other applications.

Wireless communications (e.g., XR) may be subject to strict latency requirements. In some XR applications, the rendering at the AP 105-a may be greater than or equal to 60 frames per second (fps). At each fps interval, data may be transferred (e.g., 120-200 kB of data). The majority of the data may be transmitted to the STA 115-a from the AP 105-a, and the minority amount of data may be transmitted from the STA 115-a to the AP 105-a. A general end-to-end latency requirement (e.g., 4 ms) for wireless transfer (e.g., in XR) may be met for the majority of the data packets (e.g., 99% of the packets). The end-to-end latency may include the time used by the wireless infrastructure (e.g., including the driver, fixed wireless (FW) and over the air (OTA) transmission) at both the STA 115-a and the AP 105-a. If all aspects of wireless signaling (e.g., encoding, decoding, over-the-air transmissions, processing, etc.) do not occur within such a latency budget (e.g., 4 ms), then low-latency applications (e.g., XR) may fail.

In some examples, wireless communications system 200 may support procedures for power saving. For example, STA 115-a (e.g., glasses) may be battery operated (such as in the case of wireless XR), such that conserving power may be an important factor of design. In some examples, XR headsets, or STA 115-*a*, may use a target wait time (TWT) protocol, which may save power. In a TWT protocol, the STA 115-*a* and AP 105-*a* (e.g., a phone) may agree on (e.g., negotiate via a handshake procedure) a defined TWT service period (e.g., ON time), during which data may be sent For example, data may be sent from the AP 105-*a* to the STA 115-*a*, or from the STA 115-*a* to the AP 105-*a*. Additionally, a TWT service interval may be defined, indicating the start of each (e.g., a next) TWT service period. The TWT service interval may define a periodicity of TWT service periods, where each period includes on TWT service period and an amount of time during which the STA may enter into sleep mode prior to a next TWT service period. Outside of the TWT service period, the STA 115-*a* may enter a sleep mode. In some examples, the TWT service period may be terminated early, or before the end of the service period, by sending an indication of data (e.g., data=0) or an indication of the end of service period (EOSP) in the frames transmitted by the AP 105-*a* (e.g., EOSP=1). TWT service period may be terminated early if the AP 105-*a* (e.g., or the STA 115-*a*) has a lesser amount of data (e.g., for transmission).

Wireless XR may perform open loop transmissions (e.g., instead of transmit beamforming). In some examples, channel conditions may be strong, such as if the AP 105-*a* is in the line of sight and in short range, and open loop Wi-Fi transmissions may be used. For example, a phone in the front pocket of shirt may be an example of an in line of sight with strong channel conditions. Such conditions may support transmissions that satisfy latency requirements. For example, in the case of modulation and coding scheme 9 (MCS9) 2SS 80 MHz, 200 kB may be transmitted in 2 ms, leaving 2 ms of a 4 ms latency budget as margin for latency in the rest of the system. In additional to the Wi-Fi transmission time, other factors of the system may add to latency, such as the processing time spent in driver, FW, or medium access delays (e.g., overlap basic service set (OBSS)).

However, some use cases may be non-line-of-sight, which may increase latency. For example, the AP 105-*a* may be in a different room, or in the back packet of a user. Thus, at mid-range, open loops may use more time than is provided by the latency budget. In some examples, the MCS may drop to lower values, such as MCS4, increasing latency. For example, in the use of MCS4 2SS 80 MHz, data transmission may use 3.8 ms, leaving a 0.2 ms margin of latency for the rest of the system. In some examples, latency for wireless transmissions may exceed 4 ms, which may result in failure of low-latency applications (e.g., XR).

Some wireless communications, such as XR, may support single user (SU) transmitting beamforming, MU-MIMO, or both. Data may be transferred between the AP 105-*a* (e.g., renderer) to the STA 115-*a* (e.g., HMD). The AP 105-*a* may have multiple antennas and support transmission beamforming and MU-MIMO. SU transmission beamforming may be used when there is one STA 115-*a* (e.g., HMD). In some examples, performance of SU transmission beamforming may be greater than open loop, such as if there is one STA 115-*a*. MU-MIMO may be more efficient spectrally, such as if there is more than one STA 115-*a*. In some examples, SU transmission beamforming and MU-MIMO may be used instead of open loop. The use of SU transmission beamforming and MU-MIMO may have overhead due to sounding used to obtain an estimate of the channel. Channel estimates may be satisfactory for a period of time (e.g., 20 to 100 ms), such that sounding may be performed periodically to obtain an updated channel estimate.

In some examples, wireless communications system 200 may support sounding. In some examples, sounding may be used to support transmission beamforming and MU-MIMO procedures. The wireless communication 210 may include sounding and data transmission during the service period 220. In some examples, sounding may be performed before the transmission of data. Sounding may result in a sounding overhead to the data transfer time (e.g., an increase in a total transmission time of 500 us to 1.5 ms). Sounding overhead may vary depending on a type of feedback, stream, bandwidth, data rate, etc. In some examples, sounding first and then transmitting data may breach the latency constraint, such an in cases of non-line-of-sight using a lower MCS. For instance, successfully performing sounding procedures prior to data transmission may expend a portion of a latency budget, resulting in remaining data signaling during a given service period exceeding the latency budget.

Latency reduction may be advantageous for low-latency applications (e.g., an XR system), such as in cases of lower MCS rates, non-line-of-sight use cases, etc. Ad hoc sounding (e.g., sounding when the AP 105-*a* does not have data to transmit), may reduce latency. For ad hoc sounding, the STA 115-*a* may be awake often to respond to the sounding, which may increase power usage. Shifting the TWT service period to include sounding overhead may reduce sounding latency. However, sounding may not be a part of every TWT interval, and a TWT session may be set up by the application, such that frame generation by application is synced to the TWT interval.

The AP 105-*a* and STA 115-*a* may implement MU-MIMO signaling. In some examples, capacity may be improved in MU-MIMO deployments when more than one STA 115 use a same channel for wireless communications. MU-MIMO which may rely on sounding procedures (e.g., transmission of SRSs by the AP 105-*a* prior to data transmissions for beam selection based on beamforming channel estimates determined and reported by the STA 115-*a*). However, sounding procedures to determine beamforming channel quality may increase latency, and may result in failed communications or communications that fail to satisfy the latency requirements.

The wireless communication 210 may include a sounding procedure or TWT applications. For example, wireless communication 210 may include one or more service intervals 215, which may include one or more service periods 220. The service interval 215 may include the service period 220 as well as time between service periods 220. Sounding may be performed as part of a sounding procedure 225, and the sounding procedure 225 may be performed for each service period 220 or may not be performed for each service period 220. For example, the service period 220 may include one or more SRSs as part of the sounding procedure 225, data 230, or both.

Techniques described may provide for the AP 105-*a* to transmit SRSs as part of the service period 220 after the data 230 transmission during a given service period 220, which may improve reliability of communications without sacrificing latency for data transmissions. For example, the AP 105-*a* may determine that a previous beamforming channel estimate (e.g., which may be referred to as a CBE or a CBF, among other examples) that is satisfactory for a current period may be suboptimal for a next service period 220 (e.g., due to expiration of a timer associated with the current beamforming channel estimate, mobility of the STA 115-*a*, Doppler effect of the STA, etc.). In such examples, the AP 105-*a* may first transmit data during the current service period (e.g., satisfying latency requirements by not increasing signaling overhead prior to transmission of the data), and may then perform sounding procedures 225 (e.g., transmit SRS and receive a new beamforming channel estimate from the STA 115-*a* after transmitting the data 230 during the current service period 220). The AP 105-*a* may then use the new beamforming channel estimate for transmitting data during a next service period. Each time a current beamforming channel estimate becomes suboptimal (e.g., is about to expire or parameters change at the STA 115-*a*), the AP 105-*a* may initiate another sounding procedure at the end (e.g., after transmitting data 230) during a current or next service period 220.

FIG. 3A illustrates an example of a timeline 300 and FIG. 3B illustrates an example of a timeline 301 that support opportunistic sounding for low latency applications in accordance with one or more aspects of the present disclosure. The timeline 300 describes one or more transmissions over time, where the transmissions may be communicated between an AP and a STA (e.g., the AP 105 as described with reference to FIG. 1 and the STA 115 as described with reference to FIG. 1).

In some examples of wireless communications systems (e.g., as described in greater detail with reference to FIG. 2), the STA and the AP may negotiate (e.g., via a handshake procedure) one or more service periods 325, where each service period 325 may occur during an interval 320 (e.g., interval 320-*a*, interval 320-*b*, interval 320-*c*, and interval 320-*d*, which may include service period 325-*a*, service period 325-*b*, service period 325-*c*, and service period 325-*d*, respectively). During each service period 325, the STA may perform a sounding procedure 305, may transmit data 310, or both.

In some examples, the AP and STA may perform a sounding procedure 305 prior to transmitting data 310 (e.g., the AP may initiate the sounding procedure). As further described with reference to FIG. 2, the STA may determine a beamforming channel estimate (e.g., which may be referred to as a CBE or a CBF, among other examples) based on a sounding procedure 305 for a service period 325. For example, the AP and the STA may perform a sounding procedure 305 during a first service period 325-*a*, and may communicate data 310 during the first service period 325-*a* according to a first CBF based on the first sounding procedure. The CBF determined in the service period 325-*a* may be suboptimal for a subsequent service period (e.g., the service period 325-*b*), in which case the AP and the STA may perform another sounding procedure 305 during the service period 325-*b* prior to data transmission, to determine a satisfactory CBF for the service period 325-*b*. However, performing the sounding procedure 305 prior to the data 310 may exceed a latency threshold for the service period 325, as described in greater detail with reference to FIG. 2.

In some examples, as described in greater detail with reference to FIG. 3B, the STA and the AP may perform the sounding procedure 305 prior to transmission of data 310 during each respective service period 325. For example, as described herein, transmission beamforming and MU-MIMO procedures may improve transmission efficiency and reliability (e.g., compared to open loop scenarios), but may increase signaling overhead due to sounding procedures 305. Sounding procedures may increase system latency, and may break some use cases (e.g., may result in failure of some applications). Techniques described herein may result in sounding procedures that support transmission beamforming and MU-MIMO communications without impacting latency (e.g., such that sounding procedures 305 do not exceed latency constraints for low-latency applications). Such techniques may, for example, improve reliability of communications while maintain low-latency in non-line-of-sight cases, and other cases. Sounding after data transmissions (e.g., instead of prior to transmissions) may save power, and satisfy latency constraints (e.g., without changing or otherwise affecting a start time of a TWT service period).

FIG. 3B illustrates an example of a timeline 301 that supports opportunistic sounding for low latency applications in accordance with one or more aspects of the present disclosure. The timeline 301 describes one or more transmissions over time, where the transmissions may be communicated between an AP and a STA (e.g., the AP 105 as described with reference to FIG. 1 and the STA 115 as described with reference to FIG. 1).

In some examples of a wireless communications system (e.g., as described in greater detail with reference to FIG. 2), the STA and the AP may negotiate (e.g., via a handshake procedure), one or more service periods 325, where each service period 325 may occur during an interval 320 (e.g., interval 320-*e*, interval 3204, interval 320-*g*, and interval 320-*h*, which may include service period 325-*e*, service period 325-*f*, service period 325-*g*, and service period 325-*h*, respectively). During each service period 325, the STA may perform a sounding procedure 305, may transmit data 310, or both. The intervals 320 may be defined as an amount of time, such that the time between transmitting one or more data 310.

In some examples (e.g., for low-latency applications such as XR applications), data transmissions may occur at periodic intervals. In such examples, it may be possible to predict a time at which subsequent data transmissions may occur. Similarly, the AP, the STA, or both, may determine when beamforming channel estimates (e.g., which may be referred to as CBEs or CBFs, among other examples) are received, and an AP (e.g., or a STA, or both the AP and the STA) may predict whether a current beamforming channel estimate will still be satisfactory (e.g., optimal, valid, provide for communication with a reasonable throughput and/or error rate, or the like) for a subsequent (e.g., next) data transmissions. As described herein, if sounding procedures 305 are performed prior to transmission of data 310 (e.g., as described with reference to FIG. 3A), then the AP and the STA may experience latency that exceeds a threshold or a latency budget, resulting in failure of the low-latency application. However, as described herein (e.g., with reference to FIG. 3B), the STA and the AP may perform sounding procedures 305 prior to transmission of data 310 (e.g., in a given service period 325). Because the sounding procedure 305 is performed after a current data transmission is complete, the sounding procedure 305 may not have any impact on latency of the current data transmission in a given service period 325.

For example, during service period 325-*e*, the AP and the STA may initiate communications (e.g., according to techniques illustrated with reference to FIG. 3A). For instance, the AP and the STA may perform a sounding procedure 305 (e.g., prior to transmitting data 310). Subsequently, implementing techniques described herein, the AP and the STA may perform sounding procedures 305 after transmitting data 310 in a given service period 325. For instance, during the service period 325-*f*, the AP may transmit data 310 to the STA using a previous beamforming channel estimate (e.g., a previously determined CBF determined based on sounding procedure 305 performed during the service period 325-*e*).

That is, the AP may transmit the data 310 during the service period 325-*f* using a beam selected based on the previously determined CBF.

The AP (e.g., and the STA) may determine that the current beamforming channel estimate used for transmitting the data 310 during the service period 325-*f* is suboptimal for the service period 325-*g*. For example, the AP may initiate a timer for the current beamforming channel estimate, and the timer may expire during or prior to interval 320-*g* (e.g., prior to service period 325-*g*). In some examples, the current beamforming channel estimate may be associated with a location of the STA. If the STA moves, then the current beamforming channel estimate may no longer be satisfactory, or may be suboptimal (e.g., may no longer be valid, may correspond to beam misalignment, may result to an increased error rate, may result in a lower throughput, or the like). For example, the beamforming channel estimate may result in use of a beam that reduces throughput, may be misaligned between the AP and the STA, may be associated with an increased error rate, however, such a beam may still be used for communication (e.g., useable but suboptimal). In such examples, the AP may determine that (e.g., based on Doppler effect, or a mobility status, such as a current location, a change in location, a direction, a current velocity or trajectory, among other examples) the current beamforming channel estimate (e.g., which was sufficient for transmitting the data 310 during the service period 325-*f*) may be suboptimal for transmitting data 310 during service period 325-*g*. The beamforming channel estimate may be suboptimal because it no longer functions (e.g., data transmission via a beam associated with the current beamforming channel estimate may fail, may be incomplete, may experience interference that exceeds threshold level, among other examples) or because another beamforming channel estimate would be superior to the current beamforming channel estimate (e.g., although transmissions via the beam associated with the current beamforming channel estimate may be successfully or partially successfully decoded by the receiving STA, transmissions via another beam may be more reliable). In such examples, the AP and the STA may perform a sounding procedure 305 (e.g., to determine a beamforming channel estimate for the service period 325-*g*) after transmitting data 310 during the service period 325-*f*.

The sounding reference procedure may include transmitting, by the AP, one or more sounding reference signals (SRSs). In some examples, the sounding reference procedure may include the AP transmitting a null data packet announcement (NDPA) followed be a null data packet (NDP) (e.g., the SRSs). The STA may receive the NDPA and NDP and transmit a beamforming estimate. In some examples, such as in the case of multiple users, there may be multiple NDPAs and NDPs. The STA may receive the one or more SRSs, and may perform one or more measurements on the received SRSs. Based on the measurements, the STA may generate a new beamforming channel estimate. The new beamforming channel estimate may be associated with a second beam that is different than the first beam used during service period 325-*f*. The STA may report the new beamforming channel estimate to the AP during the sounding procedure 305 performed during the service period 325-*f*. Upon receiving the new beamforming channel estimate, the AP may switch from the first beam to the second beam (e.g., according to the new beamforming channel estimate). Upon receiving the new (e.g., updated) beamforming channel estimate from the STA during the sounding procedure 305 performed during the service period 325-*f*, the AP may transmit data 310 to the STA during the service period 325-*g*.

In some examples, a current beamforming channel estimate may be satisfactory (e.g., valid, or functional, or optimal) for one or more subsequent service periods 325. For example, the new beamforming channel estimate received during service period 325-*f* may be satisfactory for the service period 325-*g*, and may also be satisfactory for the service period 325-*h*. In such examples, the AP may transmit data 310 to the STA according to the new beamforming channel estimate during the service period 325-*g*. If the new beamforming channel estimate is also satisfactory (e.g., valid, optimal) for the service period 325-*h*, then the AP may refrain from performing a sounding procedure 305 during the service period 325-*g*. For example, a timer associated with the new beamforming channel estimate may remain unexpired until during or after interval 320-*h*, or the STA may satisfy a mobility threshold (e.g., may remain in a location, or may not move outside of a threshold distance from a previous location, or may not experience Doppler effects within a threshold, among other examples). In such cases, the AP may transmit data 310 to the STA during service period 325-*h* using the same beam used for transmitting data 310 during the service period 325-*g*.

In some examples, the new beamforming channel estimate determined during the service period 325-*f* may not be satisfactory for a subsequent service period 325 (e.g., for another service period after the service period 325-*h*). In such examples, as described with reference to the service period 325-*f*, the AP may first transmit data 310, and may then (e.g., based on the timer expiring, or based on a mobility status of the STA, or based on Doppler effects experienced or reported by the STA) perform a sounding procedure 305 to determine an updated beamforming channel estimate for subsequent service periods 325.

In some examples, the STA may also determine whether a current beamforming channel estimate is satisfactory or suboptimal for a subsequent service period 325 (e.g., based on expiration of a timer, a mobility status of the STA, or Doppler effects, among other examples). In such examples, the STA may be aware of (e.g., may determine) when to wake up for sounding. The STA may determine when it has sent a beamforming channel estimate (e.g., which may be referred to as a CBE or a CBF, among other examples), and may then estimate (e.g., estimate a time window, or initiate a timer) when to stay awake for sounding a sequence (e.g., performing a sounding procedure 305). For instance, the STA may transmit a beamforming channel request as part of the sounding procedure 305 during the service period 325-*f*. The STA may then estimate that it will not need to stay awake after receiving the data 310 during the service period 325-*g* for a sounding procedure 305, but that it will stay awake after receiving the data 310 for a sounding procedure 305 during the service period 325-*h*. In some examples, the AP may transmit an indication that the STA is to remain awake or wake up for a sounding procedure 305. The indication may include a specific frame (e.g., a vendor-specific frame), or a one-bit indication, among other examples. For instance during the service period 325-*f*, the AP may transmit such an indication during the service period 325-*f* (e.g., with the data 310 or after transmission of the data 310), indicating that the STA is to wake up or remain awake for the sounding procedure 305 during the service period 325-*f*. In the absence of such an indication during the service period 325-*g*, the STA may go back to sleep immediately after the transmission of data 310. However upon receiving such an indication (e.g., during or after the transmission of data 310) during the service period 325-*h*, the STA may wake up or remain awake for the sounding procedure 305 during the service period 325-h.

Figure 4:
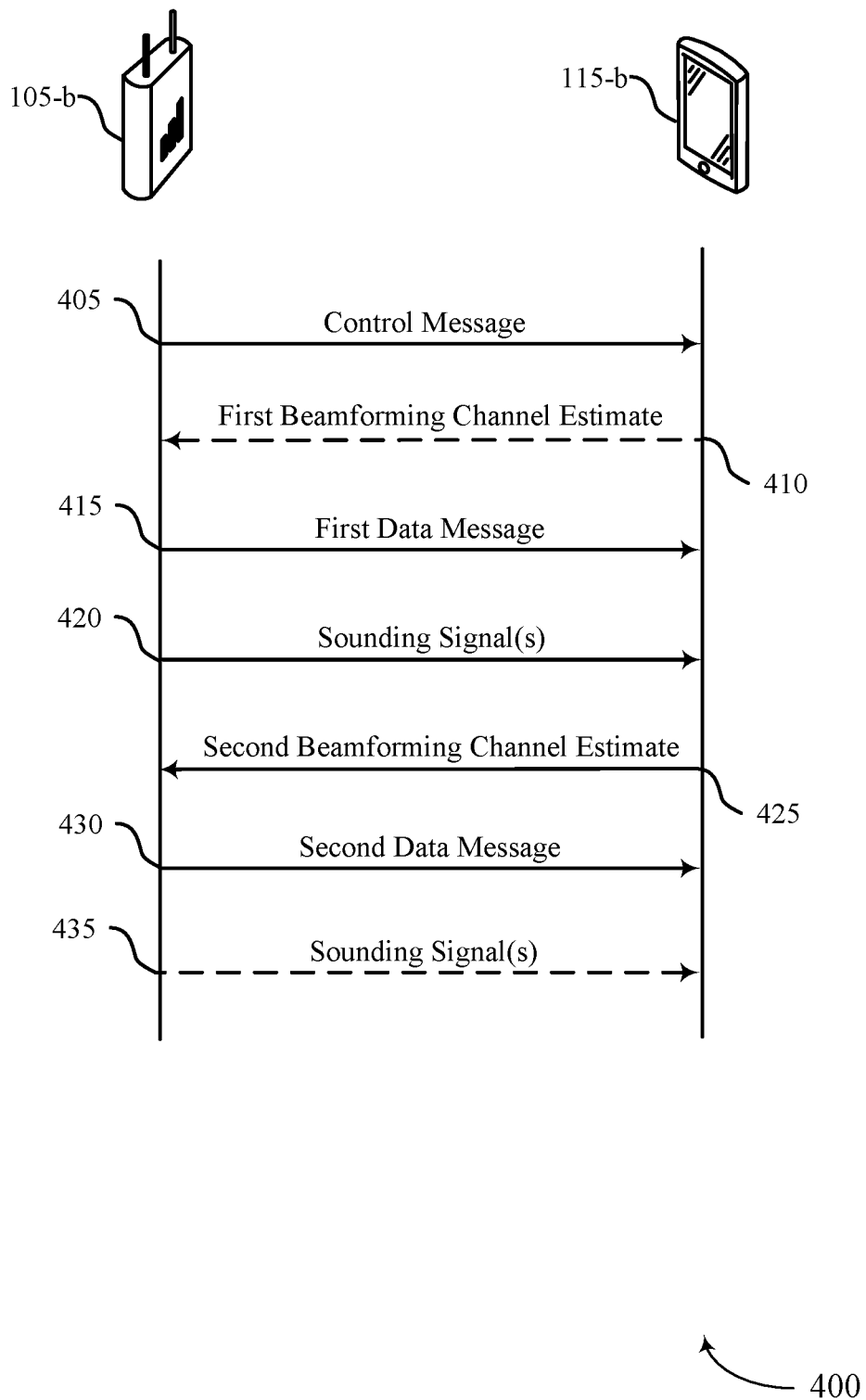
FIG. 4 illustrates an example of a process flow diagram that supports opportunistic sounding for low latency applications in accordance with one or more aspects of the present disclosure.

FIG. 4 illustrates an example of a process flow diagram 400 that supports opportunistic sounding for low latency applications in accordance with one or more aspects of the present disclosure. The process flow diagram 400 illustrates communications between an AP 105-a and a STA 115-b. The AP 105-a may be an example of an AP 105 as described with reference to FIG. 1, and the STA 115-b may be an example of a STA 115 as described with reference to FIG. 1.

At 405, the AP 105-b may transmit control message to the STA 115-b. The AP 105-b may be a virtual reality renderer, a multi-user streaming device, an audio streaming device, a video streaming device, or a wireless controller in an industrial deployment (e.g., a robotics controller, programmable logic controller (PLC), or the like), among other examples. The STA 115-b may an HMD, a virtual reality HMD, a MU steaming device, an audio streaming device, a video streaming device, a cell phone, a smart phone, or a wireless receiver in an industrial employment (e.g., a robotics receiver, actuator, or the like), among other examples. The AP 105-b may communicate, with one or more STAs 115-b, a control message indicating more than one periodic service periods for wireless communication with the one or more STAs 115-b. In some examples, the AP 105-b may transmit the control message as part of a handshake procedure or negotiation with one or more STAs 115 (e.g., including the STA 115-b) during which the timing, periodicity, duration, or other parameters of the service periods, are defined.

At 410, the STA 115-b may transmit a first beamforming channel estimate (e.g., which may be referred to as a CBE or a CBF, among other examples), to the AP 105-b. The first beamforming channel estimate may be part of an initial sounding procedure 305 as described in greater detail with respect to FIG. 3B.

At 415, the AP 105-a may transmit a first data message to the STA 115-b. The AP 105-a may transmit, via a transmit beam (e.g., associated with the first beamforming channel estimate), the data message during a first service period of the more than one periodic service periods based on the first beamforming channel estimate for the transmit beam being satisfactory (e.g., satisfying a threshold, the first service period occurring prior to expiration of a timer, a mobility status of the STA 115-b, Doppler effects at the STA 115-b, or any combination thereof) for the first service period.

At 420, the AP 105-a may transmit one or more sounding signals to the STA 115-b. The AP 105-a may transmit one or more sounding signals during the first service period after transmitting the first data message based on the first beamforming channel estimate being suboptimal (e.g., failing to satisfy a threshold, the second service period occurring after expiration of the timer, a mobility status of the STA 15-b, Doppler effects at the STA 115-b, or any combination thereof) for a second service period that occurs after the first service period. The STA 115-b may receive one or more sounding signals during the first service period after receiving the first data message based on the first beamforming channel estimate being suboptimal for the second service period that occurs after the first service period.

Transmitting the sounding signal(s) may include transmitting the one or more sounding signals during the first service period after transmitting the first data message based on expiration of a timer associated with the first beamforming channel estimate. In some examples, transmitting the sounding signal(s) may include transmitting the one or more sounding signals during the first service period after transmitting the data message based at least in part on a doppler change, a mobility status, or both, associated with the one or more STAs 115-b.

At 425, the STA 115-b may transmit a beamforming channel estimate to the AP 105-b. The second beamforming channel estimate at 425 may be different than the first beamforming channel estimate. The AP 105-b may receive, from the one or more STAs 115-b, an indication of the second beamforming channel estimate based on the one or more sounding signals. In some examples, the second beamforming channel estimate may be satisfactory for a third service period.

At 430, the AP 105-a may transmit a second data message to the STA 115-b. The AP 105-a may transmit the second data message to the one or more STAs 115-b during the second service period via a second transmit beam, where the second transmit beam is based on the second beamforming channel estimate. The second beamforming channel estimate may be satisfactory for the second service period.

At 435, the AP 105-a may transmit one or more sounding signals to the STA 115-b. In some examples, the AP 105-a may transmit one or more additional sounding signals after transmitting the second data message during the second service period based on the second beamforming channel estimate being suboptimal for a third service period that occurs after the second service period. In some examples, the AP 105-a may refrain from transmitting, and the STA 115-b may refrain from monitoring, one or more additional sounding signals during the second service period based on the second beamforming channel estimate being satisfactory for the third service period that occurs after the second service period.

Figure 5:
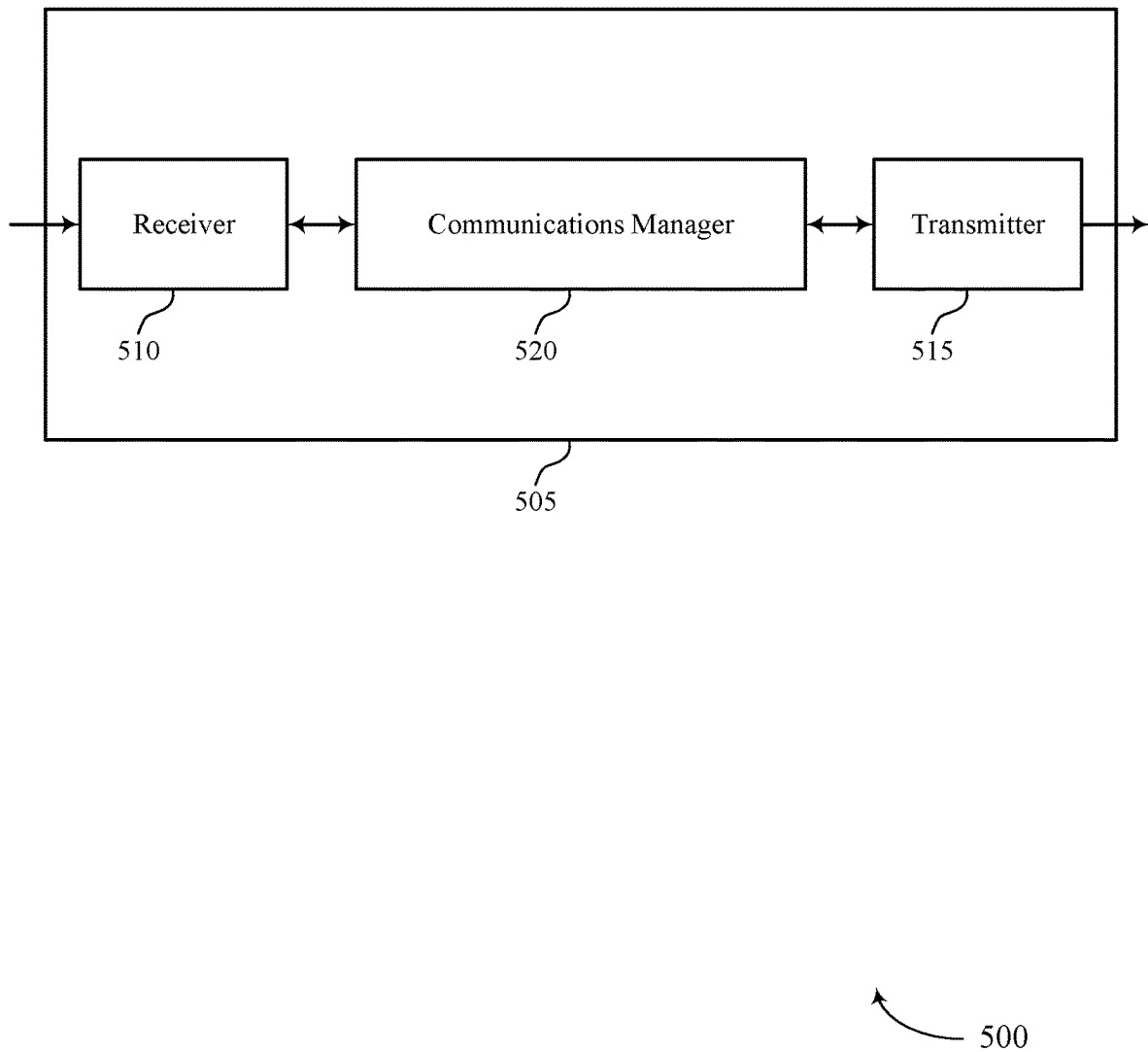
FIGS. 5 and 6 show block diagrams of devices that support opportunistic sounding for low latency applications in accordance with one or more aspects of the present disclosure.

FIG. 5 shows a block diagram 500 of a device 505 that supports opportunistic sounding for low latency applications in accordance with one or more aspects of the present disclosure. The device 505 may be an example of aspects of an AP as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to opportunistic sounding for low latency applications). Information may be passed on to other components of the device 505. The receiver 510 may utilize a single antenna or a set of multiple antennas.

The transmitter 515 may provide a means for transmitting signals generated by other components of the device 505. The transmitter 515 may utilize a single antenna or a set of multiple antennas.

The communications manager 520, the receiver 510, the transmitter 515, or various combinations thereof or various components thereof may be examples of means for performing various aspects of opportunistic sounding for low latency applications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at an AP in accordance with examples as disclosed herein. For example, the communications manager 520 may be configured as or otherwise support a means for communicating, with one or more STAs, a control message indicating a set of multiple periodic service periods for wireless communication with the one or more STAs. The communications manager 520 may be configured as or otherwise support a means for transmitting, via a transmit beam, a data message during a first service period of the set of multiple periodic service periods based on a first beamforming channel estimate for the transmit beam being satisfactory for the first service period. The communications manager 520 may be configured as or otherwise support a means for transmitting one or more sounding signals during the first service period after transmitting the data message based on the first beamforming channel estimate being suboptimal for a second service period that occurs after the first service period. The communications manager 520 may be configured as or otherwise support a means for receiving, from the one or more STAs, an indication of a second beamforming channel estimate based on the one or more sounding signals.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for opportunistic sounding for low latency applications, which may result in reduced processing, reduced power consumption, and more efficient utilization of communication resources.

Figure 6:
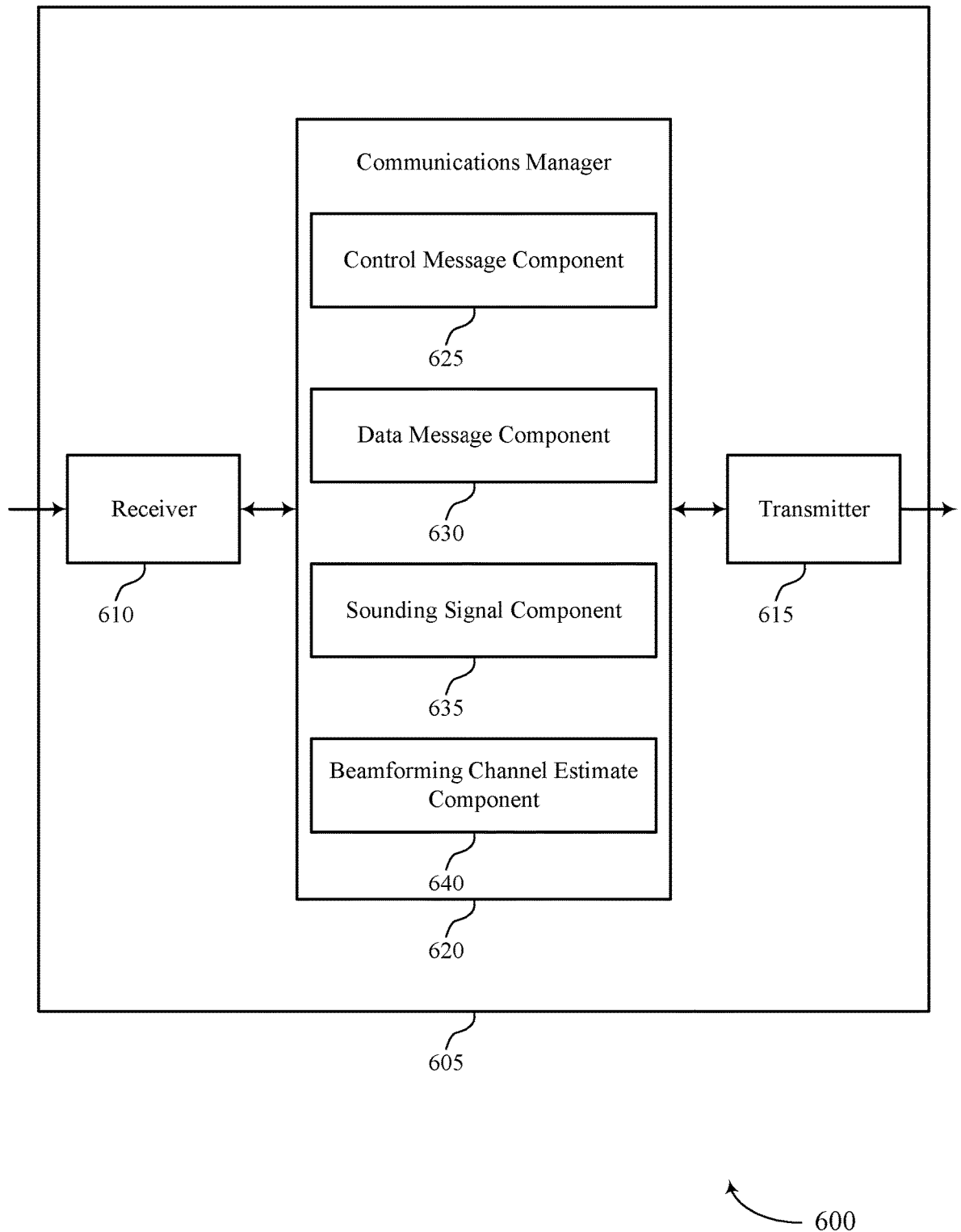

FIG. 6 shows a block diagram 600 of a device 605 that supports opportunistic sounding for low latency applications in accordance with one or more aspects of the present disclosure. The device 605 may be an example of aspects of a device 505 or an AP 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to opportunistic sounding for low latency applications). Information may be passed on to other components of the device 605. The receiver 610 may utilize a single antenna or a set of multiple antennas.

The transmitter 615 may provide a means for transmitting signals generated by other components of the device 605. The transmitter 615 may utilize a single antenna or a set of multiple antennas.

The device 605, or various components thereof, may be an example of means for performing various aspects of opportunistic sounding for low latency applications as described herein. For example, the communications manager 620 may include a control message component 625, a data message component 630, a sounding signal component 635, a beamforming channel estimate component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at an AP in accordance with examples as disclosed herein. The control message component 625 may be configured as or otherwise support a means for communicating, with one or more STAs, a control message indicating a set of multiple periodic service periods for wireless communication with the one or more STAs. The data message component 630 may be configured as or otherwise support a means for transmitting, via a transmit beam, a data message during a first service period of the set of multiple periodic service periods based on a first beamforming channel estimate for the transmit beam being satisfactory for the first service period. The sounding signal component 635 may be configured as or otherwise support a means for transmitting one or more sounding signals during the first service period after transmitting the data message based on the first beamforming channel estimate being suboptimal for a second service period that occurs after the first service period. The beamforming channel estimate component 640 may be configured as or otherwise support a means for receiving, from the one or more STAs, an indication of a second beamforming channel estimate based on the one or more sounding signals.

Figure 7:
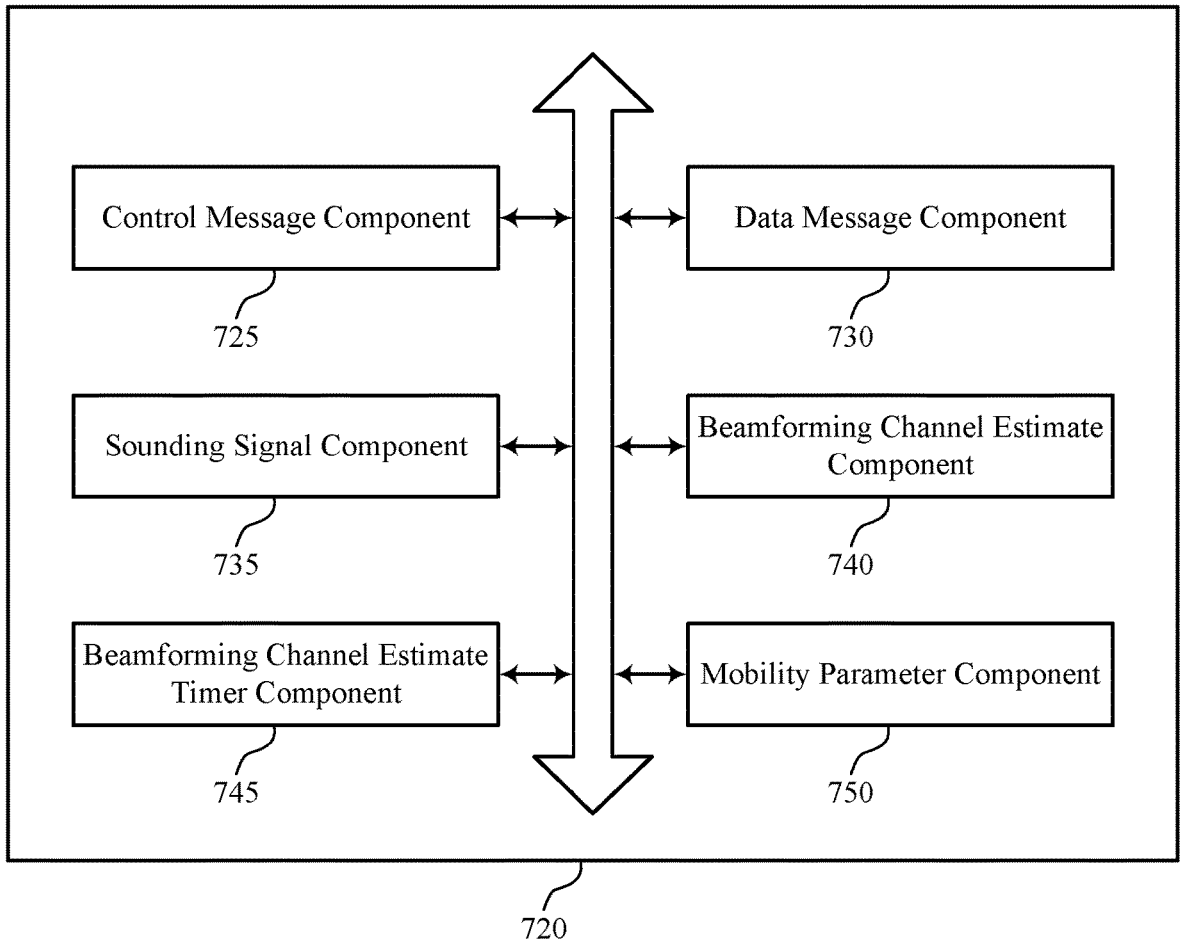
FIG. 7 shows a block diagram of a communications manager that supports opportunistic sounding for low latency applications in accordance with one or more aspects of the present disclosure.

FIG. 7 shows a block diagram 700 of a communications manager 720 that supports opportunistic sounding for low latency applications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of opportunistic sounding for low latency applications as described herein. For example, the communications manager 720 may include a control message component 725, a data message component 730, a sounding signal component 735, a beamforming channel estimate component 740, a beamforming channel estimate timer component 745, a mobility parameter component 750, or any combination thereof. Each of these components may communicate, directly or indirectly, with one another (e.g., via one or more buses).

The communications manager 720 may support wireless communications at an AP in accordance with examples as disclosed herein. The control message component 725 may be configured as or otherwise support a means for communicating, with one or more STAs, a control message indicating a set of multiple periodic service periods for wireless communication with the one or more STAs. The data message component 730 may be configured as or otherwise support a means for transmitting, via a transmit beam, a data message during a first service period of the set of multiple periodic service periods based on a first beamforming channel estimate for the transmit beam being satisfactory for the first service period. The sounding signal component 735 may be configured as or otherwise support a means for transmitting one or more sounding signals during the first service period after transmitting the data message based on the first beamforming channel estimate being suboptimal for a second service period that occurs after the first service period. The beamforming channel estimate component 740 may be configured as or otherwise support a means for receiving, from the one or more STAs, an indication of a second beamforming channel estimate based on the one or more sounding signals.

In some examples, the data message component 730 may be configured as or otherwise support a means for transmitting a second data message to the one or more STAs during the second service period via a second transmit beam, where the second transmit beam is based on the second beamforming channel estimate.

In some examples, the second beamforming channel estimate is satisfactory for the second service period.

In some examples, to support transmitting the one or more sounding signals, the beamforming channel estimate timer component 745 may be configured as or otherwise support a means for transmitting the one or more sounding signals during the first service period after transmitting the data message based on expiration of a timer associated with the first beamforming channel estimate.

In some examples, to support transmitting the one or more sounding signals, the mobility parameter component 750 may be configured as or otherwise support a means for transmitting the one or more sounding signals during the first service period after transmitting the data message based on a doppler change, a mobility status, or both, associated with the one or more STAs.

In some examples, the sounding signal component 735 may be configured as or otherwise support a means for refraining from transmitting one or more additional sounding signals during the second service period based on the second beamforming channel estimate being satisfactory for a third service period that occurs after the second service period.

In some examples, the sounding signal component 735 may be configured as or otherwise support a means for transmitting one or more additional sounding signals after transmitting a second data message during the second service period based on the second beamforming channel estimate being suboptimal for a third service period that occurs after the second service period.

In some examples, the AP includes a virtual reality renderer, a multi-user streaming device, an audio streaming device, a video streaming device, or a wireless controller in an industrial deployment.

Figure 8:
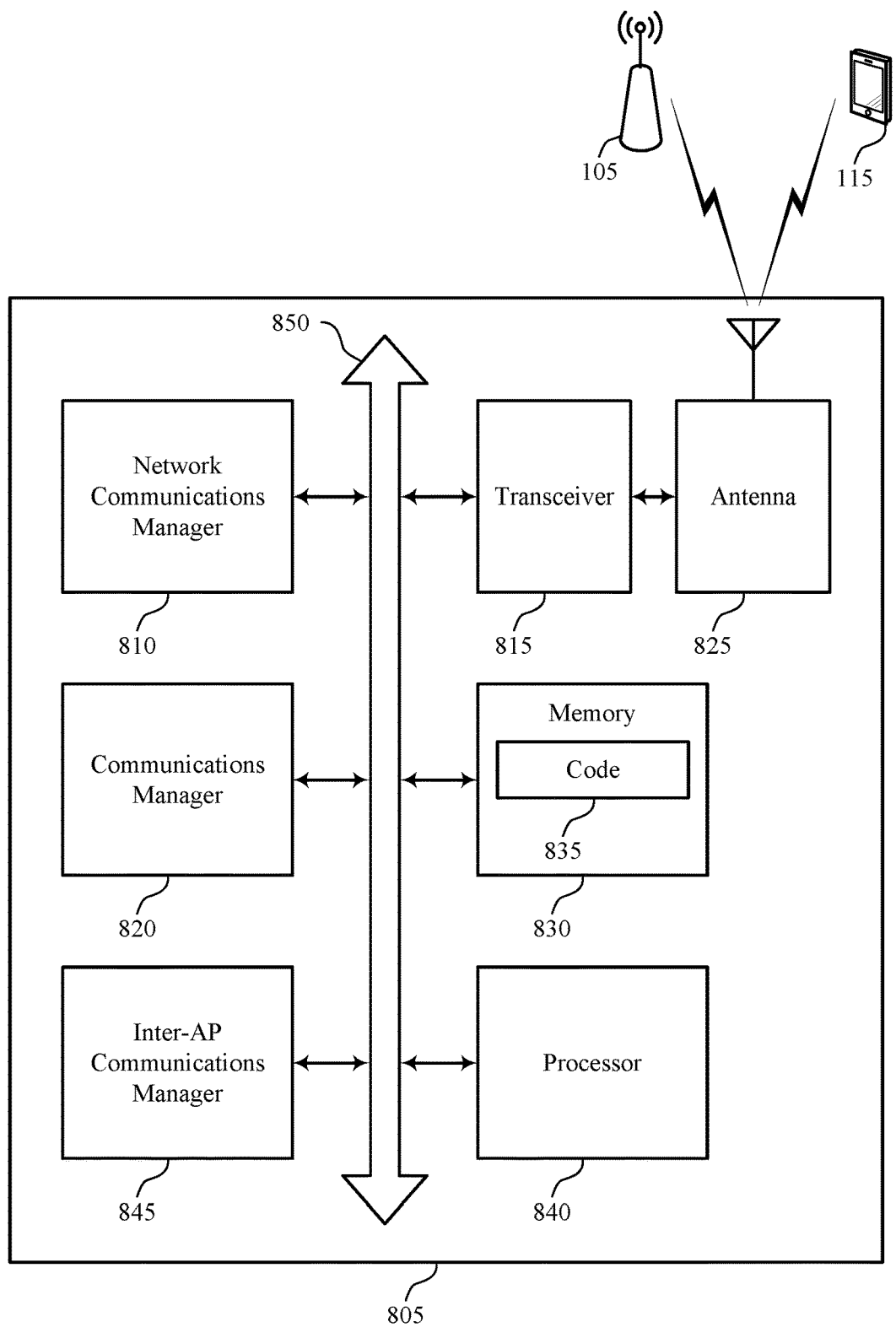
FIG. 8 shows a diagram of a system including a device that supports opportunistic sounding for low latency applications in accordance with one or more aspects of the present disclosure.

FIG. 8 shows a diagram of a system 800 including a device 805 that supports opportunistic sounding for low latency applications in accordance with one or more aspects of the present disclosure. The device 805 may be an example of or include the components of a device 505, a device 605, or an AP as described herein. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-AP communications manager 845. These components may be in electronic communication or otherwise coupled (e.g., operatively, communicatively, functionally, electronically, electrically) via one or more buses (e.g., a bus 850).

The network communications manager 810 may manage communications with a core network (e.g., via one or more wired backhaul links). For example, the network communications manager 810 may manage the transfer of data communications for client devices, such as one or more STAs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets and provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting opportunistic sounding for low latency applications). For example, the device 805 or a component of the device 805 may include a processor 840 and memory 830 coupled with or to the processor 840, the processor 840 and memory 830 configured to perform various functions described herein.

The inter-station communications manager 845 may manage communications with other APs 105, and may include a controller or scheduler for controlling communications with STAs 115 in cooperation with other APs 105. For example, the inter-station communications manager 845 may coordinate scheduling for transmissions to APs 105 for various interference mitigation techniques such as beamforming or joint transmission. In some examples, the inter-station communications manager 845 may provide an X2 interface within an LTE/LTE-A wireless communication network technology to provide communication between APs 105.

The communications manager 820 may support wireless communications at an AP in accordance with examples as disclosed herein. For example, the communications manager 820 may be configured as or otherwise support a means for communicating, with one or more STAs, a control message indicating a set of multiple periodic service periods for wireless communication with the one or more STAs. The communications manager 820 may be configured as or otherwise support a means for transmitting, via a transmit beam, a data message during a first service period of the set of multiple periodic service periods based on a first beamforming channel estimate for the transmit beam being satisfactory for the first service period. The communications manager 820 may be configured as or otherwise support a means for transmitting one or more sounding signals during the first service period after transmitting the data message based on the first beamforming channel estimate being suboptimal for a second service period that occurs after the first service period. The communications manager 820 may be configured as or otherwise support a means for receiving, from the one or more STAs, an indication of a second beamforming channel estimate based on the one or more sounding signals.

By including or configuring the communications manager 820 in accordance with examples as described herein, the device 805 may support techniques for opportunistic sounding for low latency applications, which may result in improved communication reliability, reduced latency, improved user experience related to reduced processing, reduced power consumption, more efficient utilization of communication resources, improved coordination between devices, longer battery life, and improved utilization of processing capability.

Figure 9:
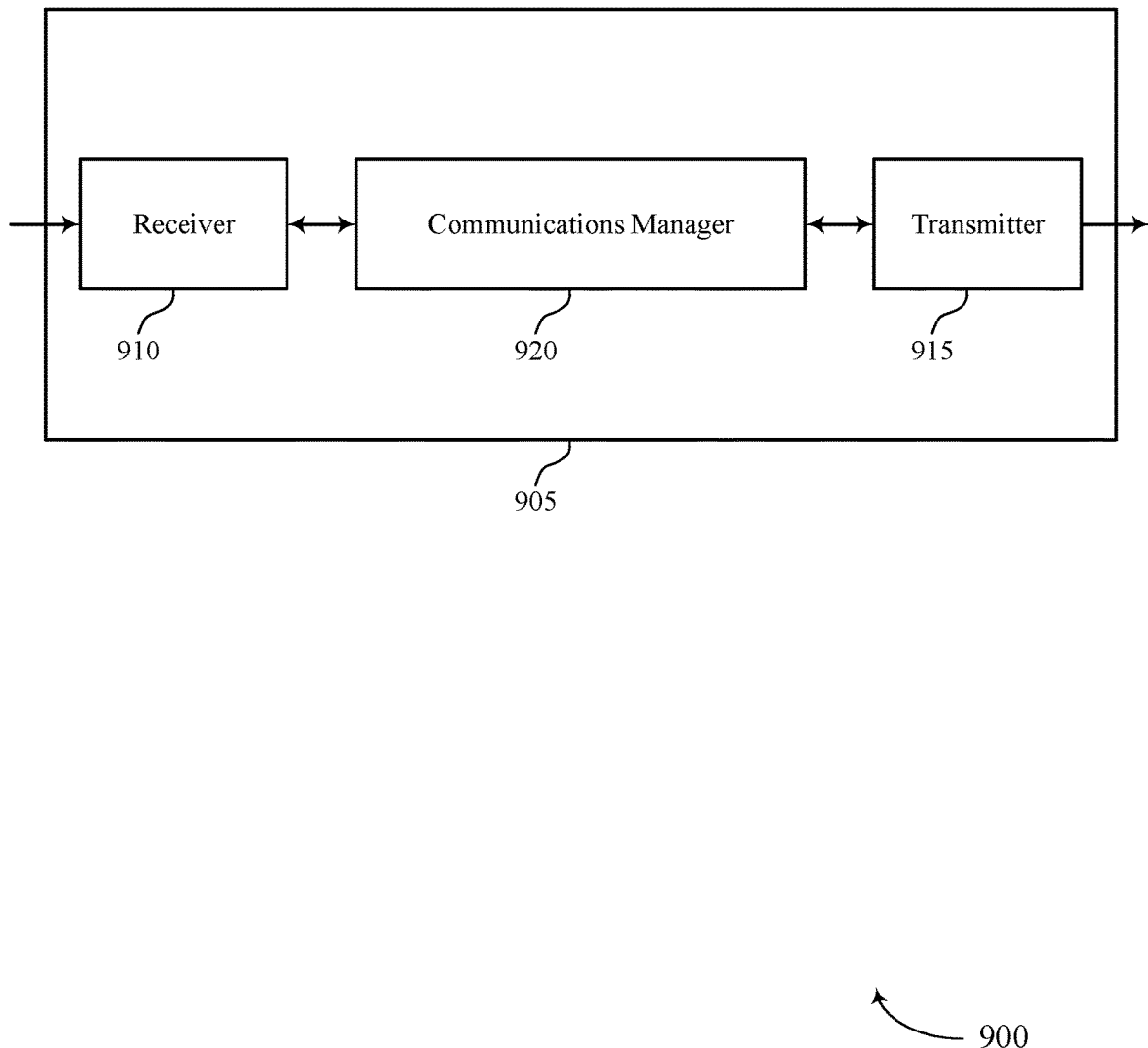
FIGS. 9 and 10 show block diagrams of devices that support opportunistic sounding for low latency applications in accordance with one or more aspects of the present disclosure.

FIG. 9 shows a block diagram 900 of a device 905 that supports opportunistic sounding for low latency applications in accordance with one or more aspects of the present disclosure. The device 905 may be an example of aspects of a STA as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to opportunistic sounding for low latency applications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to opportunistic sounding for low latency applications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of opportunistic sounding for low latency applications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a STAs in accordance with examples as disclosed herein. For example, the communications manager 920 may be configured as or otherwise support a means for communicating, with an AP, a control message indicating a set of multiple periodic service periods for wireless communication with the AP. The communications manager 920 may be configured as or otherwise support a means for receiving, via a receive beam, a data message during a first service period of the set of multiple periodic service periods based on a first beamforming channel estimate for the receive beam being satisfactory for the first service period. The communications manager 920 may be configured as or otherwise support a means for receiving one or more sounding signals during the first service period after receiving the data message based on the first beamforming channel estimate being suboptimal for a second service period that occurs after the first service period. The communications manager 920 may be configured as or otherwise support a means for transmitting, to the AP, an indication of a second beamforming channel estimate based on the one or more sounding signals.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for opportunistic sounding for low latency applications which may result in reduced processing, reduced power consumption, and more efficient utilization of communication resources.

Figure 10:
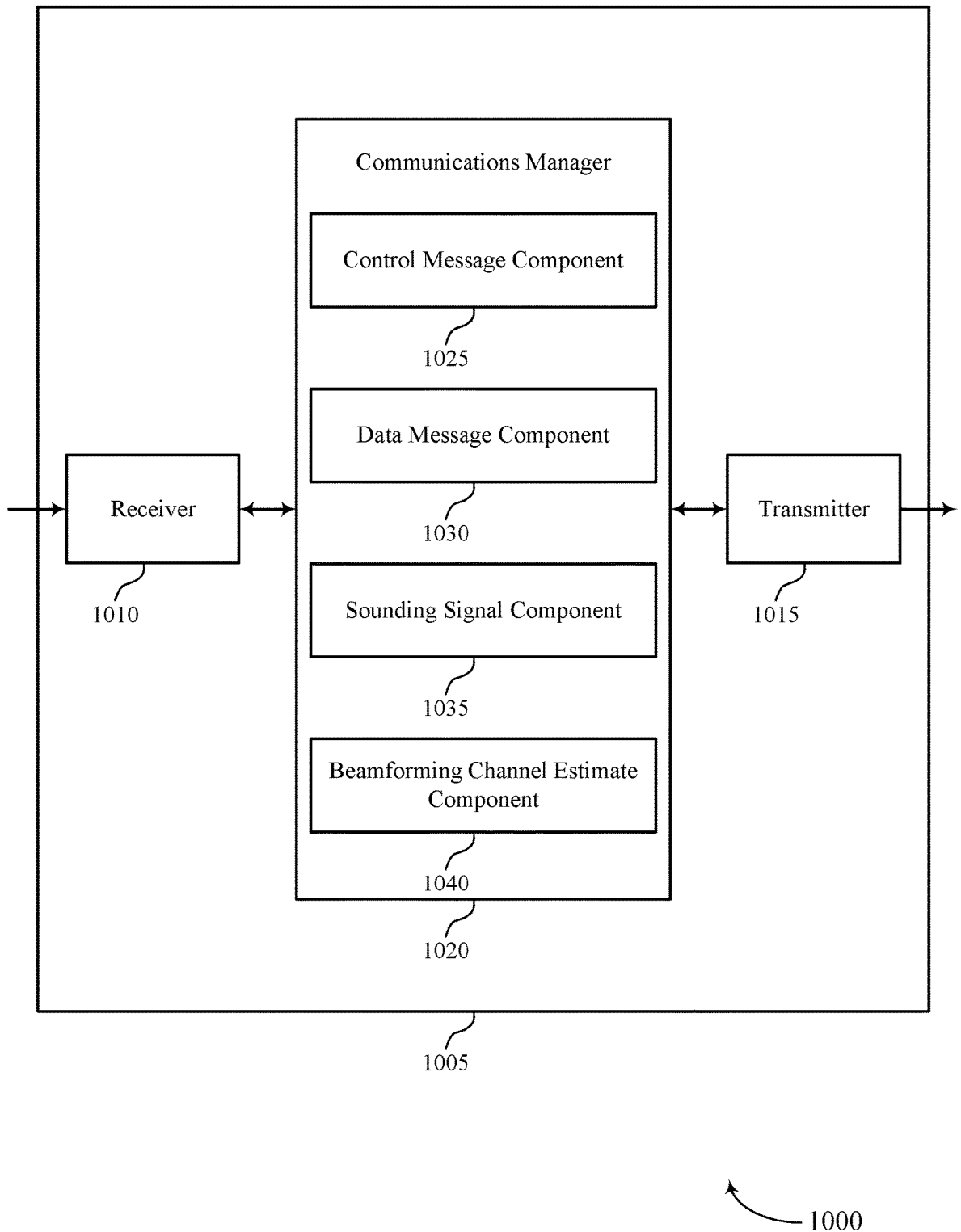

FIG. 10 shows a block diagram 1000 of a device 1005 that supports opportunistic sounding for low latency applications in accordance with one or more aspects of the present disclosure. The device 1005 may be an example of aspects of a device 905 or a STA 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to opportunistic sounding for low latency applications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to opportunistic sounding for low latency applications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of opportunistic sounding for low latency applications as described herein. For example, the communications manager 1020 may include a control message component 1025, a data message component 1030, a sounding signal component 1035, a beamforming channel estimate component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a STAs in accordance with examples as disclosed herein. The control message component 1025 may be configured as or otherwise support a means for communicating, with an AP, a control message indicating a set of multiple periodic service periods for wireless communication with the AP. The data message component 1030 may be configured as or otherwise support a means for receiving, via a receive beam, a data message during a first service period of the set of multiple periodic service periods based on a first beamforming channel estimate for the receive beam being satisfactory for the first service period. The sounding signal component 1035 may be configured as or otherwise support a means for receiving one or more sounding signals during the first service period after receiving the data message based on the first beamforming channel estimate being suboptimal for a second service period that occurs after the first service period. The beamforming channel estimate component 1040 may be configured as or otherwise support a means for transmitting, to the AP, an indication of a second beamforming channel estimate based on the one or more sounding signals.

Figure 11:
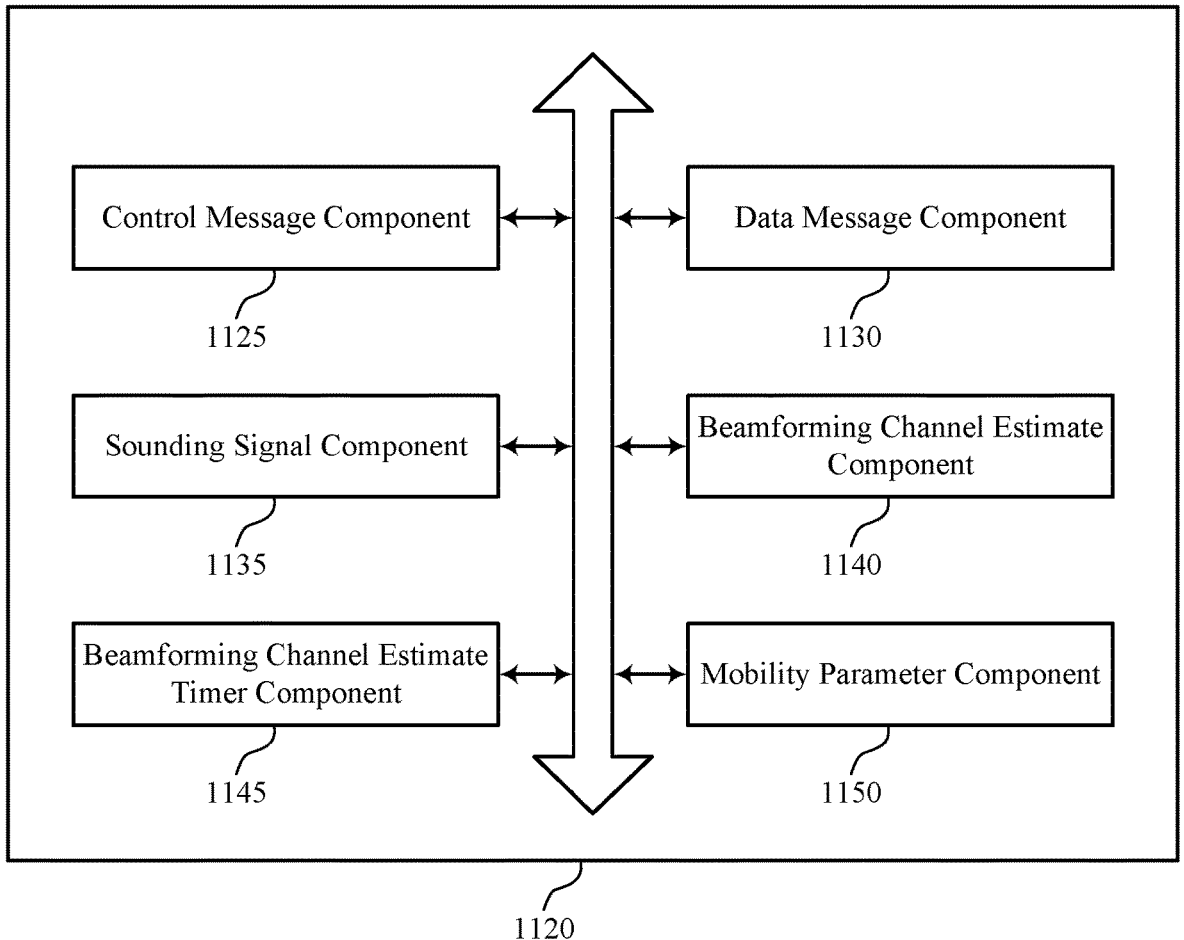
FIG. 11 shows a block diagram of a communications manager that supports opportunistic sounding for low latency applications in accordance with one or more aspects of the present disclosure.

FIG. 11 shows a block diagram 1100 of a communications manager 1120 that supports opportunistic sounding for low latency applications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of opportunistic sounding for low latency applications as described herein. For example, the communications manager 1120 may include a control message component 1125, a data message component 1130, a sounding signal component 1135, a beamforming channel estimate component 1140, a beamforming channel estimate timer component 1145, a mobility parameter component 1150, or any combination thereof. Each of these components may communicate, directly or indirectly, with one another (e.g., via one or more buses).

The communications manager 1120 may support wireless communications at a STAs in accordance with examples as disclosed herein. The control message component 1125 may be configured as or otherwise support a means for communicating, with an AP, a control message indicating a set of multiple periodic service periods for wireless communication with the AP. The data message component 1130 may be configured as or otherwise support a means for receiving, via a receive beam, a data message during a first service period of the set of multiple periodic service periods based on a first beamforming channel estimate for the receive beam being satisfactory for the first service period. The sounding signal component 1135 may be configured as or otherwise support a means for receiving one or more sounding signals during the first service period after receiving the data message based on the first beamforming channel estimate being suboptimal for a second service period that occurs after the first service period. The beamforming channel estimate component 1140 may be configured as or otherwise support a means for transmitting, to the AP, an indication of a second beamforming channel estimate based on the one or more sounding signals.

In some examples, the data message component 1130 may be configured as or otherwise support a means for receiving a second data message from the AP during the second service period via a second transmit beam, where the second transmit beam is based on the second beamforming channel estimate.

In some examples, the second beamforming channel estimate is satisfactory for the second service period.

In some examples, to support receiving the one or more sounding signals, the beamforming channel estimate timer component 1145 may be configured as or otherwise support a means for receiving the one or more sounding signals during the first service period after receiving the data message based on expiration of a timer associated with the first beamforming channel estimate.

In some examples, to support receiving the one or more sounding signals, the mobility parameter component 1150 may be configured as or otherwise support a means for receiving the one or more sounding signals during the first service period after receiving the data message based on a doppler change, a mobility status, or both, associated with the STA.

In some examples, the sounding signal component 1135 may be configured as or otherwise support a means for refraining from monitoring for one or more additional sounding signals during the second service period based on the second beamforming channel estimate being satisfactory for a third service period that occurs after the second service period.

In some examples, the sounding signal component 1135 may be configured as or otherwise support a means for receiving one or more additional sounding signals after receiving a second data message during the second service period based on the second beamforming channel estimate being suboptimal for a third service period that occurs after the second service period.

In some examples, the STA includes a virtual reality head mount device, a multi-user streaming device, an audio streaming device, a video streaming device, or a wireless receiver in an industrial deployment.

Figure 12:
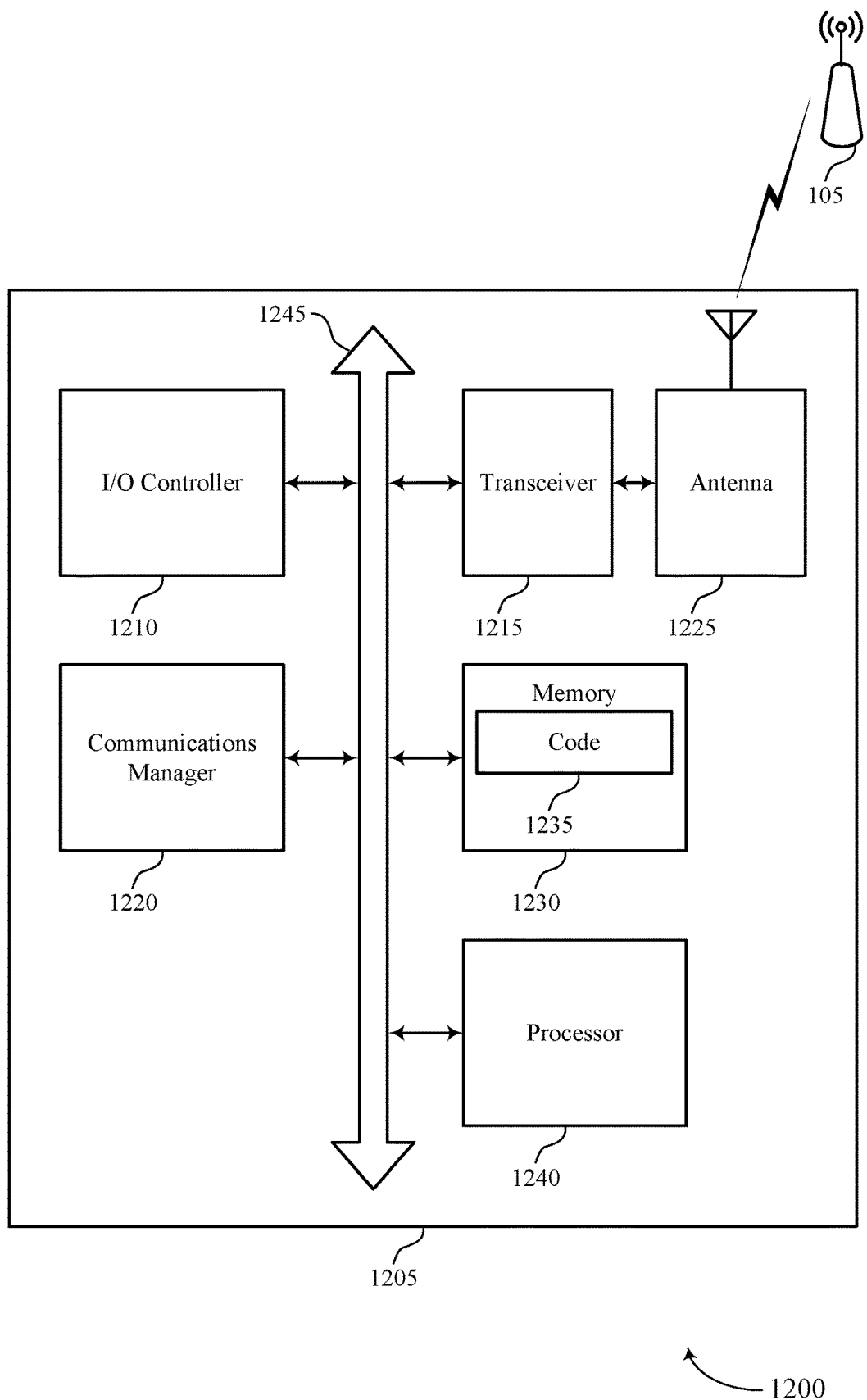
FIG. 12 shows a diagram of a system including a device that supports opportunistic sounding for low latency applications in accordance with one or more aspects of the present disclosure.

FIG. 12 shows a diagram of a system 1200 including a device 1205 that supports opportunistic sounding for low latency applications in accordance with one or more aspects of the present disclosure. The device 1205 may be an example of or include the components of a device 905, a device 1005, or a STA as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. In some other cases, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting opportunistic sounding for low latency applications). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a STA in accordance with examples as disclosed herein. For example, the communications manager 1220 may be configured as or otherwise support a means for communicating, with an AP, a control message indicating a set of multiple periodic service periods for wireless communication with the AP. The communications manager 1220 may be configured as or otherwise support a means for receiving, via a receive beam, a data message during a first service period of the set of multiple periodic service periods based on a first beamforming channel estimate for the receive beam being satisfactory for the first service period. The communications manager 1220 may be configured as or otherwise support a means for receiving one or more sounding signals during the first service period after receiving the data message based on the first beamforming channel estimate being suboptimal for a second service period that occurs after the first service period. The communications manager 1220 may be configured as or otherwise support a means for transmitting, to the AP, an indication of a second beamforming channel estimate based on the one or more sounding signals.

By including or configuring the communications manager 1220 in accordance with examples as described herein, the device 1205 may support techniques for opportunistic sounding for low latency applications which may result in improved communication reliability, reduced latency, improved user experience related to reduced processing, reduced power consumption, more efficient utilization of communication resources, improved coordination between devices, longer battery life, and improved utilization of processing capability.

Figure 13:
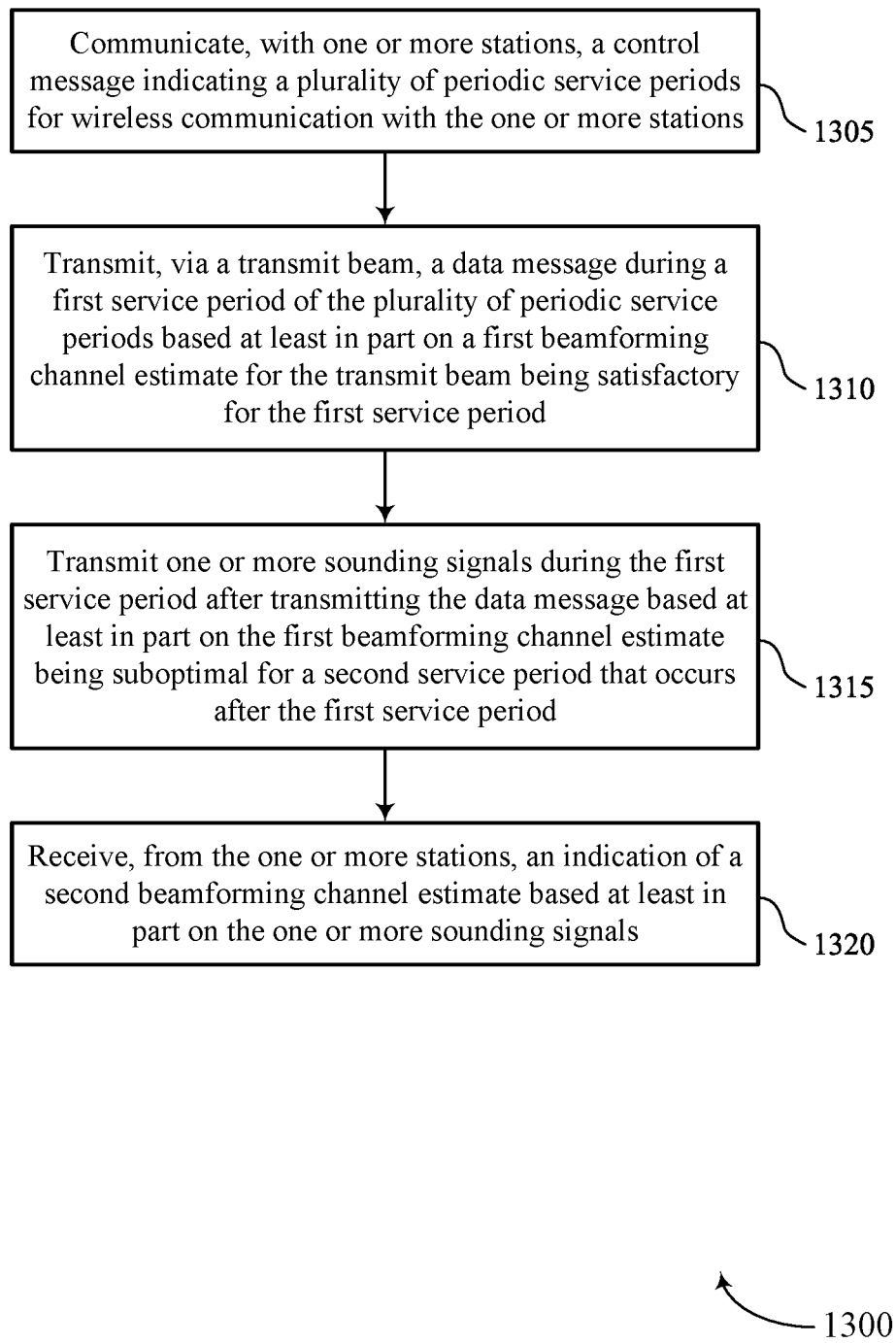
FIGS. 13 through 16 show flowcharts illustrating methods that support opportunistic sounding for low latency applications in accordance with one or more aspects of the present disclosure.

FIG. 13 shows a flowchart illustrating a method 1300 that supports opportunistic sounding for low latency applications in accordance with one or more aspects of the present disclosure. The operations of the method 1300 may be implemented by an AP or its components as described herein. For example, the operations of the method 1300 may be performed by an AP as described with reference to FIGS. FIG. 1 through 8. In some examples, an AP may execute a set of instructions to control the functional elements of the AP to perform the described functions. Additionally, or alternatively, the AP may perform aspects of the described functions using special-purpose hardware.

At 1305, the method may include communicating, with one or more STAs, a control message indicating a set of multiple periodic service periods for wireless communication with the one or more STAs. The operations of 1305 may be performed in accordance with examples as disclosed herein. In some examples, aspects of the operations of 1305 may be performed by a control message component 725 as described with reference to FIG. 7.

At 1310, the method may include transmitting, via a transmit beam, a data message during a first service period of the set of multiple periodic service periods based on a first beamforming channel estimate for the transmit beam being satisfactory (e.g., optimal) for the first service period. The operations of 1310 may be performed in accordance with examples as disclosed herein. In some examples, aspects of the operations of 1310 may be performed by a data message component 730 as described with reference to FIG. 7.

At 1315, the method may include transmitting one or more sounding signals during the first service period after transmitting the data message based on the first beamforming channel estimate being suboptimal for a second service period that occurs after the first service period. The operations of 1315 may be performed in accordance with examples as disclosed herein. In some examples, aspects of the operations of 1315 may be performed by a sounding signal component 735 as described with reference to FIG. 7.

At 1320, the method may include receiving, from the one or more STAs, an indication of a second beamforming channel estimate based on the one or more sounding signals. The operations of 1320 may be performed in accordance with examples as disclosed herein. In some examples, aspects of the operations of 1320 may be performed by a beamforming channel estimate component 740 as described with reference to FIG. 7.

Figure 14:
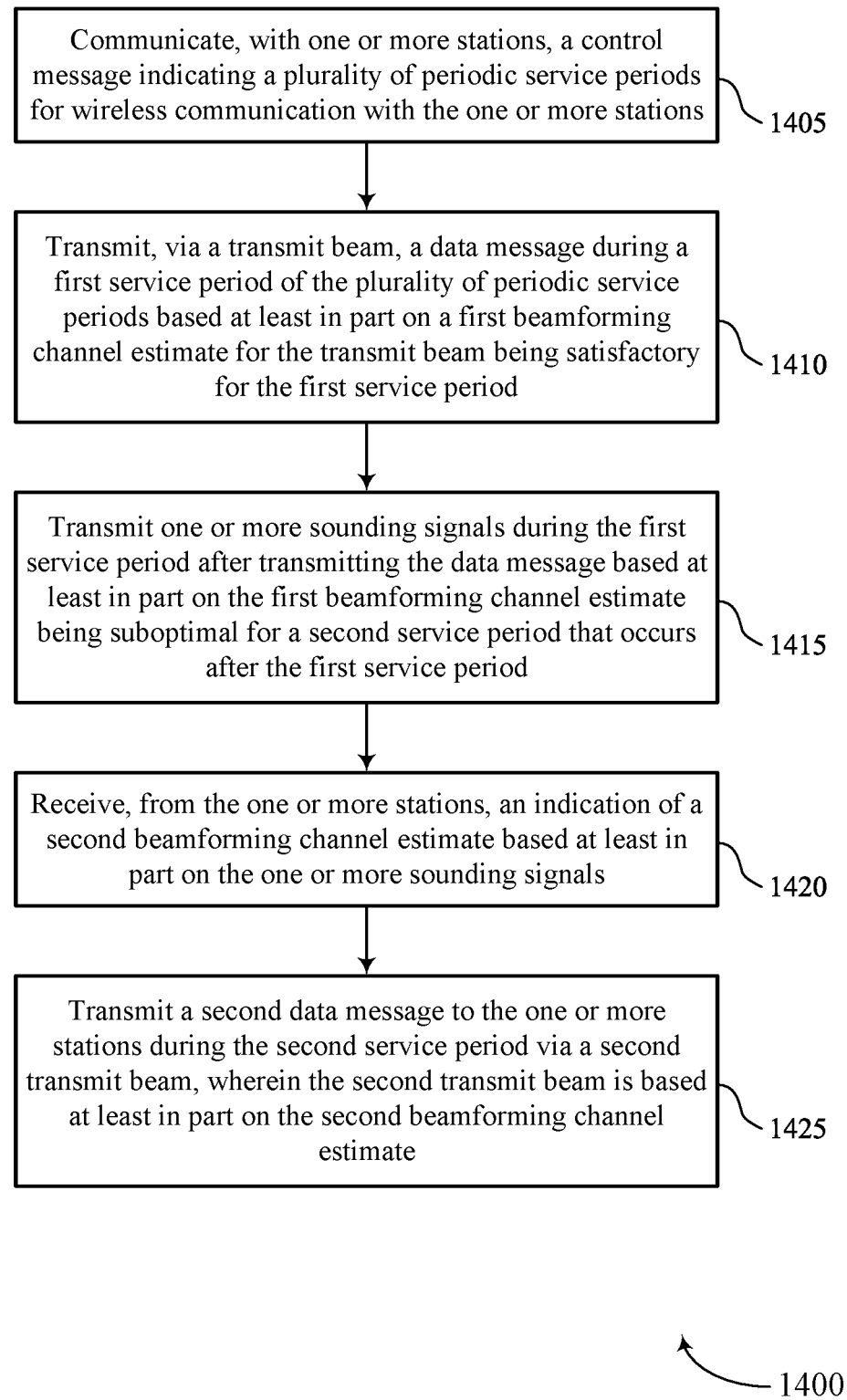

FIG. 14 shows a flowchart illustrating a method 1400 that supports opportunistic sounding for low latency applications in accordance with one or more aspects of the present disclosure. The operations of the method 1400 may be implemented by an AP or its components as described herein. For example, the operations of the method 1400 may be performed by an AP as described with reference to FIGS. FIG. 1 through 8. In some examples, an AP may execute a set of instructions to control the functional elements of the AP to perform the described functions. Additionally, or alternatively, the AP may perform aspects of the described functions using special-purpose hardware.

At 1405, the method may include communicating, with one or more STAs, a control message indicating a set of multiple periodic service periods for wireless communication with the one or more STAs. The operations of 1405 may be performed in accordance with examples as disclosed herein. In some examples, aspects of the operations of 1405 may be performed by a control message component 725 as described with reference to FIG. 7.

At 1410, the method may include transmitting, via a transmit beam, a data message during a first service period of the set of multiple periodic service periods based on a first beamforming channel estimate for the transmit beam being satisfactory for the first service period. The operations of 1410 may be performed in accordance with examples as disclosed herein. In some examples, aspects of the operations of 1410 may be performed by a data message component 730 as described with reference to FIG. 7.

At 1415, the method may include transmitting one or more sounding signals during the first service period after transmitting the data message based on the first beamforming channel estimate being suboptimal for a second service period that occurs after the first service period. The operations of 1415 may be performed in accordance with examples as disclosed herein. In some examples, aspects of the operations of 1415 may be performed by a sounding signal component 735 as described with reference to FIG. 7.

At 1420, the method may include receiving, from the one or more STAs, an indication of a second beamforming channel estimate based on the one or more sounding signals. The operations of 1420 may be performed in accordance with examples as disclosed herein. In some examples, aspects of the operations of 1420 may be performed by a beamforming channel estimate component 740 as described with reference to FIG. 7.

At 1425, the method may include transmitting a second data message to the one or more STAs during the second service period via a second transmit beam, where the second transmit beam is based on the second beamforming channel estimate. The operations of 1425 may be performed in accordance with examples as disclosed herein. In some examples, aspects of the operations of 1425 may be performed by a data message component 730 as described with reference to FIG. 7.

Figure 15:
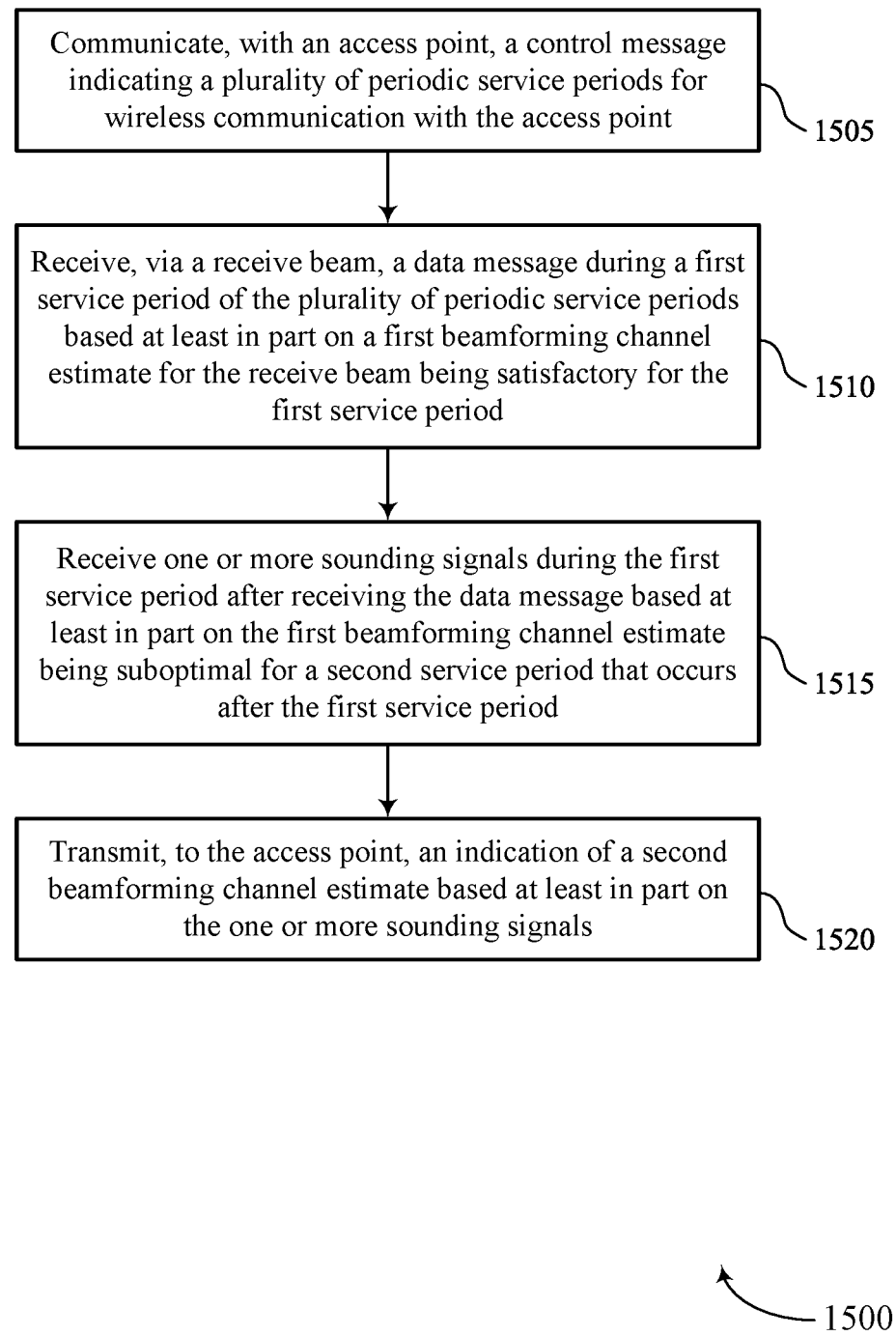

FIG. 15 shows a flowchart illustrating a method 1500 that supports opportunistic sounding for low latency applications in accordance with one or more aspects of the present disclosure. The operations of the method 1500 may be implemented by a STA or its components as described herein. For example, the operations of the method 1500 may be performed by a STA as described with reference to FIGS. FIGS. 1 through 4 and 9 through 12. In some examples, a STA may execute a set of instructions to control the functional elements of the STA to perform the described functions. Additionally, or alternatively, the STA may perform aspects of the described functions using special-purpose hardware.

At 1505, the method may include communicating, with an AP, a control message indicating a set of multiple periodic service periods for wireless communication with the AP. The operations of 1505 may be performed in accordance with examples as disclosed herein. In some examples, aspects of the operations of 1505 may be performed by a control message component 1125 as described with reference to FIG. 11.

At 1510, the method may include receiving, via a receive beam, a data message during a first service period of the set of multiple periodic service periods based on a first beamforming channel estimate for the receive beam being satisfactory for the first service period. The operations of 1510 may be performed in accordance with examples as disclosed herein. In some examples, aspects of the operations of 1510 may be performed by a data message component 1130 as described with reference to FIG. 11.

At 1515, the method may include receiving one or more sounding signals during the first service period after receiving the data message based on the first beamforming channel estimate being suboptimal for a second service period that occurs after the first service period. The operations of 1515 may be performed in accordance with examples as disclosed herein. In some examples, aspects of the operations of 1515 may be performed by a sounding signal component 1135 as described with reference to FIG. 11.

At 1520, the method may include transmitting, to the AP, an indication of a second beamforming channel estimate based on the one or more sounding signals. The operations of 1520 may be performed in accordance with examples as disclosed herein. In some examples, aspects of the operations of 1520 may be performed by a beamforming channel estimate component 1140 as described with reference to FIG. 11.

Figure 16:
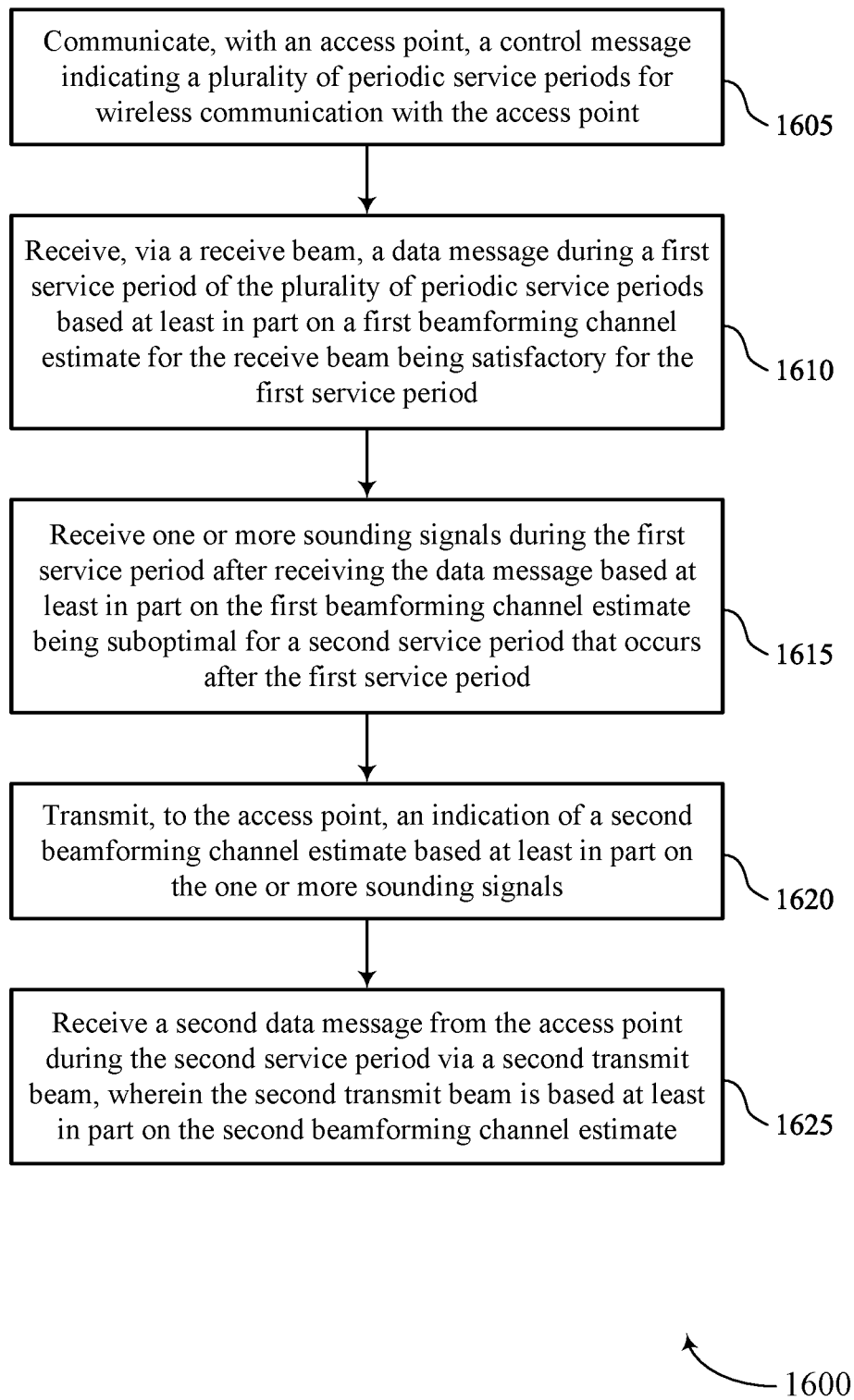

FIG. 16 shows a flowchart illustrating a method 1600 that supports opportunistic sounding for low latency applications in accordance with one or more aspects of the present disclosure. The operations of the method 1600 may be implemented by a STA or its components as described herein. For example, the operations of the method 1600 may be performed by a STA as described with reference to FIGS. 1 through 4 and 9 through 12. In some examples, a STA may execute a set of instructions to control the functional elements of the STA to perform the described functions. Additionally, or alternatively, the STA may perform aspects of the described functions using special-purpose hardware.

At 1605, the method may include communicating, with an AP, a control message indicating a set of multiple periodic service periods for wireless communication with the AP. The operations of 1605 may be performed in accordance with examples as disclosed herein. In some examples, aspects of the operations of 1605 may be performed by a control message component 1125 as described with reference to FIG. 11.

At 1610, the method may include receiving, via a receive beam, a data message during a first service period of the set of multiple periodic service periods based on a first beamforming channel estimate for the receive beam being satisfactory for the first service period. The operations of 1610 may be performed in accordance with examples as disclosed herein. In some examples, aspects of the operations of 1610 may be performed by a data message component 1130 as described with reference to FIG. 11.

At 1615, the method may include receiving one or more sounding signals during the first service period after receiving the data message based on the first beamforming channel estimate being suboptimal for a second service period that occurs after the first service period. The operations of 1615 may be performed in accordance with examples as disclosed herein. In some examples, aspects of the operations of 1615 may be performed by a sounding signal component 1135 as described with reference to FIG. 11.

At 1620, the method may include transmitting, to the AP, an indication of a second beamforming channel estimate based on the one or more sounding signals. The operations of 1620 may be performed in accordance with examples as disclosed herein. In some examples, aspects of the operations of 1620 may be performed by a beamforming channel estimate component 1140 as described with reference to FIG. 11.

At 1625, the method may include receiving a second data message from the AP during the second service period via a second transmit beam, where the second transmit beam is based on the second beamforming channel estimate. The operations of 1625 may be performed in accordance with examples as disclosed herein. In some examples, aspects of the operations of 1625 may be performed by a data message component 1130 as described with reference to FIG. 11.

The following provides an overview of aspects of the present disclosure:

Aspect 1: A method for wireless communications at an AP, comprising: communicating, with one or more STAs, a control message indicating a plurality of periodic service periods for wireless communication with the one or more STAs; transmitting, via a transmit beam, a data message during a first service period of the plurality of periodic service periods based at least in part on a first beamforming channel estimate for the transmit beam being satisfactory for the first service period; transmitting one or more sounding signals during the first service period after transmitting the data message based at least in part on the first beamforming channel estimate being suboptimal for a second service period that occurs after the first service period; and receiving, from the one or more STAs, an indication of a second beamforming channel estimate based at least in part on the one or more sounding signals.

Aspect 2: The method of aspect 1, further comprising: transmitting a second data message to the one or more STAs during the second service period via a second transmit beam, wherein the second transmit beam is based at least in part on the second beamforming channel estimate.

Aspect 3: The method of aspect 2, wherein the second beamforming channel estimate is satisfactory for the second service period.

Aspect 4: The method of any of aspects 1 through 3, wherein transmitting the one or more sounding signals further comprises: transmitting the one or more sounding signals during the first service period after transmitting the data message based at least in part on expiration of a timer associated with the first beamforming channel estimate.

Aspect 5: The method of any of aspects 1 through 4, wherein transmitting the one or more sounding signals further comprises: transmitting the one or more sounding signals during the first service period after transmitting the data message based at least in part on a doppler change, a mobility status, or both, associated with the one or more STAs.

Aspect 6: The method of any of aspects 1 through 5, further comprising: refraining from transmitting one or more additional sounding signals during the second service period based at least in part on the second beamforming channel estimate being satisfactory for a third service period that occurs after the second service period.

Aspect 7: The method of any of aspects 1 through 6, further comprising: transmitting one or more additional sounding signals after transmitting a second data message during the second service period based at least in part on the second beamforming channel estimate being suboptimal for a third service period that occurs after the second service period.

Aspect 8: The method of any of aspects 1 through 7, wherein the AP comprises a virtual reality renderer, a multi-user streaming device, an audio streaming device, a video streaming device, or a wireless controller in an industrial deployment.

Aspect 9: A method for wireless communications at a STA, comprising: communicating, with an AP, a control message indicating a plurality of periodic service periods for wireless communication with the AP; receiving, via a receive beam, a data message during a first service period of the plurality of periodic service periods based at least in part on a first beamforming channel estimate for the receive beam being satisfactory for the first service period; receiving one or more sounding signals during the first service period after receiving the data message based at least in part on the first beamforming channel estimate being suboptimal for a second service period that occurs after the first service period; and transmitting, to the AP, an indication of a second beamforming channel estimate based at least in part on the one or more sounding signals.

Aspect 10: The method of aspect 9, further comprising: receiving a second data message from the AP during the second service period via a second transmit beam, wherein the second transmit beam is based at least in part on the second beamforming channel estimate.

Aspect 11: The method of aspect 10, wherein the second beamforming channel estimate is satisfactory for the second service period.

Aspect 12: The method of any of aspects 9 through 11, wherein receiving the one or more sounding signals further comprises: receiving the one or more sounding signals during the first service period after receiving the data message based at least in part on expiration of a timer associated with the first beamforming channel estimate.

Aspect 13: The method of any of aspects 9 through 12, wherein receiving the one or more sounding signals further comprises: receiving the one or more sounding signals during the first service period after receiving the data message based at least in part on a doppler change, a mobility status, or both, associated with the STA.

Aspect 14: The method of any of aspects 9 through 13, further comprising: refraining from monitoring for one or more additional sounding signals during the second service period based at least in part on the second beamforming channel estimate being satisfactory for a third service period that occurs after the second service period.

Aspect 15: The method of any of aspects 9 through 14, further comprising: receiving one or more additional sounding signals after receiving a second data message during the second service period based at least in part on the second beamforming channel estimate being suboptimal for a third service period that occurs after the second service period.

Aspect 16: The method of any of aspects 9 through 15, wherein the STA comprises a virtual reality head mount device, a multi-user streaming device, an audio streaming device, a video streaming device, or a wireless receiver in an industrial deployment.

Aspect 17: An apparatus for wireless communications at an AP, comprising a processor; memory coupled with the processor; and instructions stored in the memory and executable by the processor to cause the apparatus to perform a method of any of aspects 1 through 8.

Aspect 18: An apparatus for wireless communications at an AP, comprising at least one means for performing a method of any of aspects 1 through 8.

Aspect 19: A non-transitory computer-readable medium storing code for wireless communications at an AP, the code comprising instructions executable by a processor to perform a method of any of aspects 1 through 8.

Aspect 20: An apparatus for wireless communications at a STA, comprising a processor; memory coupled with the processor; and instructions stored in the memory and executable by the processor to cause the apparatus to perform a method of any of aspects 9 through 16.

Aspect 21: An apparatus for wireless communications at a STA, comprising at least one means for performing a method of any of aspects 9 through 16.

Aspect 22: A non-transitory computer-readable medium storing code for wireless communications at a STA, the code comprising instructions executable by a processor to perform a method of any of aspects 9 through 16.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at an access point, comprising:
   communicating, with one or more stations, a control message indicating a plurality of periodic service periods for wireless communication with the one or more stations;
   transmitting, via a transmit beam, a data message during a first service period of the plurality of periodic service periods based at least in part on a first beamforming channel estimate for the transmit beam being satisfactory for the first service period;
   transmitting one or more sounding signals during the first service period after transmitting the data message based at least in part on the first beamforming channel estimate being suboptimal for a second service period that occurs after the first service period; and
   receiving, from the one or more stations, an indication of a second beamforming channel estimate based at least in part on the one or more sounding signals.

2. The method of claim 1, further comprising:
transmitting a second data message to the one or more stations during the second service period via a second transmit beam, wherein the second transmit beam is based at least in part on the second beamforming channel estimate.

3. The method of claim 2, wherein the second beamforming channel estimate is satisfactory for the second service period.

4. The method of claim 1, wherein transmitting the one or more sounding signals further comprises:
transmitting the one or more sounding signals during the first service period after transmitting the data message based at least in part on expiration of a timer associated with the first beamforming channel estimate.

5. The method of claim 1, wherein transmitting the one or more sounding signals further comprises:
transmitting the one or more sounding signals during the first service period after transmitting the data message based at least in part on a doppler change, a mobility status, or both, associated with the one or more stations.

6. The method of claim 1, further comprising:
refraining from transmitting one or more additional sounding signals during the second service period based at least in part on the second beamforming channel estimate being satisfactory for a third service period that occurs after the second service period.

7. The method of claim 1, further comprising:
transmitting one or more additional sounding signals after transmitting a second data message during the second service period based at least in part on the second beamforming channel estimate being suboptimal for a third service period that occurs after the second service period.

8. The method of claim 1, wherein the access point comprises a virtual reality renderer, a multi-user streaming device, an audio streaming device, a video streaming device, or a wireless controller in an industrial deployment.

9. A method for wireless communications at a station, comprising:
communicating, with an access point, a control message indicating a plurality of periodic service periods for wireless communication with the access point;
receiving, via a receive beam, a data message during a first service period of the plurality of periodic service periods based at least in part on a first beamforming channel estimate for the receive beam being satisfactory for the first service period;
receiving one or more sounding signals during the first service period after receiving the data message based at least in part on the first beamforming channel estimate being suboptimal for a second service period that occurs after the first service period; and
transmitting, to the access point, an indication of a second beamforming channel estimate based at least in part on the one or more sounding signals.

10. The method of claim 9, further comprising:
receiving a second data message from the access point during the second service period via a second transmit beam, wherein the second transmit beam is based at least in part on the second beamforming channel estimate.

11. The method of claim 10, wherein the second beamforming channel estimate is satisfactory for the second service period.

12. The method of claim 9, wherein receiving the one or more sounding signals further comprises:
receiving the one or more sounding signals during the first service period after receiving the data message based at least in part on expiration of a timer associated with the first beamforming channel estimate.

13. The method of claim 9, wherein receiving the one or more sounding signals further comprises:
receiving the one or more sounding signals during the first service period after receiving the data message based at least in part on a doppler change, a mobility status, or both, associated with the station.

14. The method of claim 9, further comprising:
refraining from monitoring for one or more additional sounding signals during the second service period based at least in part on the second beamforming channel estimate being satisfactory for a third service period that occurs after the second service period.

15. The method of claim 9, further comprising:
receiving one or more additional sounding signals after receiving a second data message during the second service period based at least in part on the second beamforming channel estimate being suboptimal for a third service period that occurs after the second service period.

16. The method of claim 9, wherein the station comprises a virtual reality head mount device, a multi-user streaming device, an audio streaming device, a video streaming device, or a wireless receiver in an industrial deployment.

17. An apparatus for wireless communications at an access point, comprising:
one or more processors;
memory coupled with the one or more processors; and
instructions stored in the memory and executable by the one or more processors to cause the apparatus to:
communicate, with one or more stations, a control message indicating a plurality of periodic service periods for wireless communication with the one or more stations;
transmit, via a transmit beam, a data message during a first service period of the plurality of periodic service periods based at least in part on a first beamforming channel estimate for the transmit beam being satisfactory for the first service period;
transmit one or more sounding signals during the first service period after transmitting the data message based at least in part on the first beamforming channel estimate being suboptimal for a second service period that occurs after the first service period; and
receive, from the one or more stations, an indication of a second beamforming channel estimate based at least in part on the one or more sounding signals.

18. The apparatus of claim 17, wherein the instructions are further executable by the one or more processors to cause the apparatus to:
transmit a second data message to the one or more stations during the second service period via a second transmit beam, wherein the second transmit beam is based at least in part on the second beamforming channel estimate.

19. The apparatus of claim 17, wherein the second beamforming channel estimate is satisfactory for the second service period.

20. The apparatus of claim 17, wherein the instructions to transmit the one or more sounding signals are further executable by the one or more processors to cause the apparatus to:

transmit the one or more sounding signals during the first service period after transmitting the data message based at least in part on expiration of a timer associated with the first beamforming channel estimate.

21. The apparatus of claim 17, wherein the instructions to transmit the one or more sounding signals are further executable by the one or more processors to cause the apparatus to:
  transmit the one or more sounding signals during the first service period after transmitting the data message based at least in part on a doppler change, a mobility status, or both, associated with the one or more stations.

22. The apparatus of claim 17, wherein the instructions are further executable by the one or more processors to cause the apparatus to:
  refrain from transmitting one or more additional sounding signals during the second service period based at least in part on the second beamforming channel estimate being satisfactory for a third service period that occurs after the second service period.

23. The apparatus of claim 17, wherein the instructions are further executable by the one or more processors to cause the apparatus to:
  transmit one or more additional sounding signals after transmitting a second data message during the second service period based at least in part on the second beamforming channel estimate being suboptimal for a third service period that occurs after the second service period.

24. An apparatus for wireless communications at a station, comprising:
  one or more processors;
  memory coupled with the one or more processors; and
  instructions stored in the memory and executable by the one or more processors to cause the apparatus to:
    communicate, with an access point, a control message indicating a plurality of periodic service periods for wireless communication with the access point;
    receive, via a receive beam, a data message during a first service period of the plurality of periodic service periods based at least in part on a first beamforming channel estimate for the receive beam being satisfactory for the first service period;
    receive one or more sounding signals during the first service period after receiving the data message based at least in part on the first beamforming channel estimate being suboptimal for a second service period that occurs after the first service period; and
    transmit, to the access point, an indication of a second beamforming channel estimate based at least in part on the one or more sounding signals.

25. The apparatus of claim 24, wherein the instructions are further executable by the one or more processors to cause the apparatus to:
  receive a second data message from the access point during the second service period via a second transmit beam, wherein the second transmit beam is based at least in part on the second beamforming channel estimate.

26. The apparatus of claim 24, wherein the second beamforming channel estimate is satisfactory for the second service period.

27. The apparatus of claim 24, wherein the instructions to receive the one or more sounding signals are further executable by the one or more processors to cause the apparatus to:
  receive the one or more sounding signals during the first service period after receiving the data message based at least in part on expiration of a timer associated with the first beamforming channel estimate.

28. The apparatus of claim 24, wherein the instructions to receive the one or more sounding signals are further executable by the one or more processors to cause the apparatus to:
  receive the one or more sounding signals during the first service period after receiving the data message based at least in part on a doppler change, a mobility status, or both, associated with the station.

29. The apparatus of claim 24, wherein the instructions are further executable by the one or more processors to cause the apparatus to:
  refrain from monitoring for one or more additional sounding signals during the second service period based at least in part on the second beamforming channel estimate being satisfactory for a third service period that occurs after the second service period.

30. The apparatus of claim 24, wherein the instructions are further executable by the one or more processors to cause the apparatus to:
  receive one or more additional sounding signals after receiving a second data message during the second service period based at least in part on the second beamforming channel estimate being suboptimal for a third service period that occurs after the second service period.

* * * * *